US012801132B2

(12) United States Patent
Uei et al.

(10) Patent No.: US 12,801,132 B2
(45) Date of Patent: Nov. 17, 2026

(54) DETERIORATION DIAGNOSIS DEVICE, DETERIORATION DIAGNOSIS METHOD, AND ELECTRIC MOTOR CONTROL DEVICE

(71) Applicant: Hitachi Industrial Equipment Systems Co., Ltd., Tokyo (JP)

(72) Inventors: Yusuke Uei, Tokyo (JP); Hideto Takada, Tokyo (JP); Yuuri Takano, Tokyo (JP); Tetsuo Yanada, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 554 days.

(21) Appl. No.: 18/276,492

(22) PCT Filed: Jun. 25, 2021

(86) PCT No.: PCT/JP2021/024180
§ 371 (c)(1),
(2) Date: Aug. 9, 2023

(87) PCT Pub. No.: WO2022/269913
PCT Pub. Date: Dec. 29, 2022

(65) Prior Publication Data
US 2024/0310828 A1 Sep. 19, 2024

(51) Int. Cl.
*G05B 23/02* (2006.01)

(52) U.S. Cl.
CPC ..... *G05B 23/0283* (2013.01); *G05B 23/0221* (2013.01); *G05B 23/0262* (2013.01); *G05B 2219/24065* (2013.01)

(58) Field of Classification Search
CPC ...... G05B 19/416; G05B 11/36; G05B 11/42; G05B 19/19; G05B 2219/42104;
(Continued)

(56) References Cited

U.S. PATENT DOCUMENTS 12,074,551 B2 * 8/2024 Hara .................. H02M 7/5395
2003/0065486 A1 4/2003 Sumida et al.
(Continued)

FOREIGN PATENT DOCUMENTS

CN 1963702 A 5/2007
CN 112975575 A 6/2021
(Continued)

OTHER PUBLICATIONS

International Search Report (PCT/ISA/210) issued in PCT Application No. PCT/JP2021/024180 dated Jul. 27, 2021 with English translation (4 pages).
(Continued)

*Primary Examiner* — Mohammad K Islam
(74) *Attorney, Agent, or Firm* — Crowell & Moring LLP

(57) ABSTRACT

Provided are a deterioration diagnosis device and deterioration diagnosis method that make it possible to carry out accurate deterioration diagnosis that takes into consideration not only vibration quantity but also other vibration factors such as vibration cycle. The deterioration diagnosis device includes a deterioration diagnosis unit for carrying out electric motor deterioration diagnosis corresponding to electric motor driving information and a vibration information storage device for storing the diagnosis results of the deterioration diagnosis unit. The deterioration diagnosis unit stores a plurality of types of information relating to the electric motor vibration state that have been calculated from the driving information in the vibration information storage device and determines that vibration has occurred if the information relating to the vibration state of the electric motor is larger than a prescribed threshold.

11 Claims, 15 Drawing Sheets

(58) Field of Classification Search
CPC ............ G05B 23/0283; G05B 23/0221; G05B 23/0262; G05B 2219/24065; H02P 21/22; H02P 21/00; H02P 23/14; H02P 23/20; H02P 27/08; H02P 8/14; H02P 21/06; H02P 21/18; H02P 2207/01; H02P 2207/05; H02P 23/04; H02P 23/16; H02P 23/186; H02P 25/03; H02P 27/085; H02P 29/02; H02P 29/40; H02P 5/46; H02P 5/50; H02P 5/69; H02P 6/04; H02P 6/10; H02P 6/182; H02P 8/36; H02P 29/024; G01M 15/046; G01M 99/004; G01R 31/343; G01R 19/10; G01H 3/04; G01H 1/003; G01H 11/06
See application file for complete search history.

(56) References Cited

U.S. PATENT DOCUMENTS

| | | | | |
|---|---|---|---|---|
| 2013/0057191 | A1* | 3/2013 | Yoshiura | G05B 19/19 318/600 |
| 2016/0342125 | A1* | 11/2016 | Nito | G03G 15/6529 |
| 2017/0111529 | A1* | 4/2017 | Sato | H04N 1/00602 |
| 2020/0028454 | A1* | 1/2020 | Kinomura | H02P 29/50 |
| 2021/0178546 | A1 | 6/2021 | Murota | |
| 2022/0216813 | A1* | 7/2022 | Murakami | H02P 5/46 |
| 2022/0269204 | A1* | 8/2022 | Takatsu | G03G 15/0136 |
| 2023/0316827 | A1* | 10/2023 | Yoshino | G01H 1/003 |

FOREIGN PATENT DOCUMENTS

| | | | |
|---|---|---|---|
| JP | 2001-337716 | A | 12/2001 |
| JP | 2012-125038 | A | 6/2012 |
| JP | 2014-183678 | A | 9/2014 |
| JP | 2019-184406 | A | 10/2019 |
| JP | 2020-25462 | A | 2/2020 |
| JP | 2021-52441 | A | 4/2021 |
| WO | WO 2019/049188 | A1 | 3/2019 |

OTHER PUBLICATIONS

Japanese-language Written Opinion (PCT/ISA/237) issued in PCT Application No. PCT/JP2021/024180 dated Jul. 27, 2021 with partial English translation (7 pages).
Chinese-language Office Action issued in Chinese Application No. 202180094769.2 dated Apr. 15, 2026, with English translation (45 pages).

* cited by examiner

DETERIORATION DIAGNOSIS DEVICE, DETERIORATION DIAGNOSIS METHOD, AND ELECTRIC MOTOR CONTROL DEVICE

TECHNICAL FIELD

The present invention relates to a deterioration diagnosis device and a deterioration diagnosis method of an electric motor and an electric motor control device.

BACKGROUND ART

When in driving an electric motor in electric motor control, the electric motor and a device to be driven coupled to the electric motor are aging deteriorated, vibration may occur. There is a technique for diagnosing the aging deterioration of the electric motor and the device to be driven coupled to the electric motor, by detecting the vibration of the electric motor and the device to be driven.

PTL 1 (Japanese Unexamined Patent Application Publication No. 2020-25462) describes "applied is a motor control system that driving controls a motor that drives a motor driving mechanism, the motor control system having a data abnormality judgment unit that judges data abnormality on the basis of a comparison between a predetermined data abnormality judgment threshold value and a Mahalanobis distance calculated on the basis of time series detection data at the time of motor driving, a machine deterioration judgment unit that judges the aging deterioration of the motor driving mechanism on the basis of the occurrence frequency of the data abnormality, and a motor stopping unit that notifies the occurrence of the aging deterioration and stops the driving control of the motor when the machine deterioration judgment unit detects the occurrence of the aging deterioration" (see paragraph [0007]).

CITATION LIST

Patent Literature

PTL 1: Japanese Unexamined Patent Application Publication No. 2020-25462

SUMMARY OF INVENTION

Technical Problem

PTL 1 discloses the technique for judging the abnormality of the entire machine system from the data abnormality judgment threshold value and the time series detection data at the time of motor driving.

However, PTL 1 notes the vibration amount at the time of deterioration diagnosis, but does not refer to other vibration factors, such as the vibration frequency and the vibration cycle. In addition, PTL1 does not refer to the vibration reduction method after the deterioration diagnosis.

An object of the present invention is to provide a deterioration diagnosis device and a deterioration diagnosis method that perform appropriate deterioration diagnosis in consideration of not only a vibration amount but also other vibration factors, such as a vibration cycle.

Solution to Problem

In order to solve the above problems, as one example of the "deterioration diagnosis device" of the present invention, the deterioration diagnosis device is provided to be integral with or separated from an electric motor control device that includes: a power convertor that outputs power that drives an electric motor connected to a device to be driven; a position controller that outputs a speed instruction value according to a deviation between a position instruction value and a position detection value of the electric motor; a speed controller that outputs a torque electric current instruction value according to a deviation between the speed instruction value and a speed detection value of the electric motor; and an electric current controller that adjusts an output electric current of the power convertor according to a deviation between the torque electric current instruction value and a torque electric current detection value supplied to the electric motor, and the deterioration diagnosis device has: a deterioration diagnosis unit that performs the deterioration diagnosis of the electric motor according to operation information of the electric motor; and a vibration information storing device that stores a diagnosis result of the deterioration diagnosis unit. In the deterioration diagnosis device, the deterioration diagnosis unit stores, in the vibration information storing device, a plurality of types of information related to the vibration state of the electric motor calculated from the operation information, and judges that vibration occurs when the information related to the vibration state of the electric motor is larger than a predetermined threshold value.

Further, as one example of the "deterioration diagnosis method" of the present invention, the deterioration diagnosis method comprises: a first step by which an electric motor control device that drives an electric motor obtains the operation information of the electric motor; a second step by which a plurality of types of information related to the vibration state of the electric motor is measured from the obtained operation information; a third step by which the plurality of types of information related to the measured vibration state of the electric motor is stored; a fourth step by which it is judged that the electric motor is vibrated when the information related to the vibration state is above a predetermined threshold value, and a vibration judgement result is displayed to a user; and a fifth step by which a vibration characteristic amount is extracted from the information that judges the vibration to suppress the vibration.

Further, as one example of the "electric motor control device" of the present invention, the electric motor control device includes: a power convertor that outputs power that drives an electric motor connected to a device to be driven; a position controller that outputs a speed instruction value according to the deviation between the position instruction value and the position detection value of the electric motor; a speed controller that outputs a torque electric current instruction value according to a deviation between the speed instruction value and the speed detection value of the electric motor; and an electric current controller that adjusts an output electric current of the power convertor according to a deviation between the torque electric current instruction value and a torque electric current detection value supplied to the electric motor. In the electric motor control device that includes a deterioration diagnosis device, the deterioration diagnosis device has: a deterioration diagnosis unit that performs a deterioration diagnosis of the electric motor according to an operation information of the electric motor; a vibration information storing device that stores a diagnosis result of the deterioration diagnosis unit; and a control gain adjustment device that creates a control gain instruction to the controller on the basis of the diagnosis result of the deterioration diagnosis unit, the deterioration diagnosis unit stores, in the vibration information storing device, a plurality of types of information related to the vibration state of the electric motor calculated from the operation information, and judges that vibration occurs when the information related to the vibration state of the electric motor is larger than a predetermined threshold value, and the control gain adjustment device sends the control gain instruction that adjusts a control gain, to the controller of the electric motor control device when the deterioration diagnosis unit judges that the vibration occurs.

Advantageous Effects of Invention

According to one aspect of the invention, accurate deterioration diagnosis can be performed while taking into consideration not only vibration quantity but also other vibration factors such as vibration cycle.

Further, by adjusting the control gain of the control device so as to suppress vibration by the deterioration diagnosis result of the electric motor, driving of the electric motor in which the vibration of the electric motor is suppressed is achieved.

Objects, configurations, and effects other than the above will be apparent from the description of the following embodiments.

DESCRIPTION OF EMBODIMENTS

When in driving an electric motor in electric motor control, the electric motor and a device to be driven coupled to the electric motor are aging deteriorated, vibration may occur due to the wear and the change in shape of the electric motor and the device to be driven. When the electric motor and the device to be driven are vibrated, a position detector and an electric current detector mounted on the electric motor are brought into the vibration state.

In the present invention, the vibration of the electric motor is detected as a deterioration diagnosis method. The speed detection waveform or the like of the electric motor is measured in any section and at any timing, and when the speed detection waveform or the like has a certain amplitude amount, it is judged that the electric motor is in the vibration state. In addition, information related to the vibration, such as the vibration amplitude amount and the vibration frequency of the speed detection value or the like, when the electric motor is in the vibration state is stored in a vibration information storing device. The vibration information storing device displays the information related to the vibration, as vibration information, on a display device that is connected to an electric motor control device, thereby adjusting the control gain so that it suppresses the vibration of the electric motor according to the demand of a user.

Hereinafter, a deterioration diagnosis device and a deterioration diagnosis method of the electric motor will be described, and embodiments for means by which while the electric motor is driven, the presence or absence of the vibration occurrence of the speed detection value that is one of the operation information of the electric motor is monitored, and when the electric motor is brought into the vibration state, the vibration information related to the vibration is obtained and stored, and is displayed on the display device, as needed, so that the vibration of the electric motor is suppressed. However, the present invention is not construed as limited to the description contents of the following embodiments. Those skilled in the art can easily understand that in the scope not departing from the idea and the purport of the present invention, its specific configuration can be changed.

Embodiment 1

Figure 1:
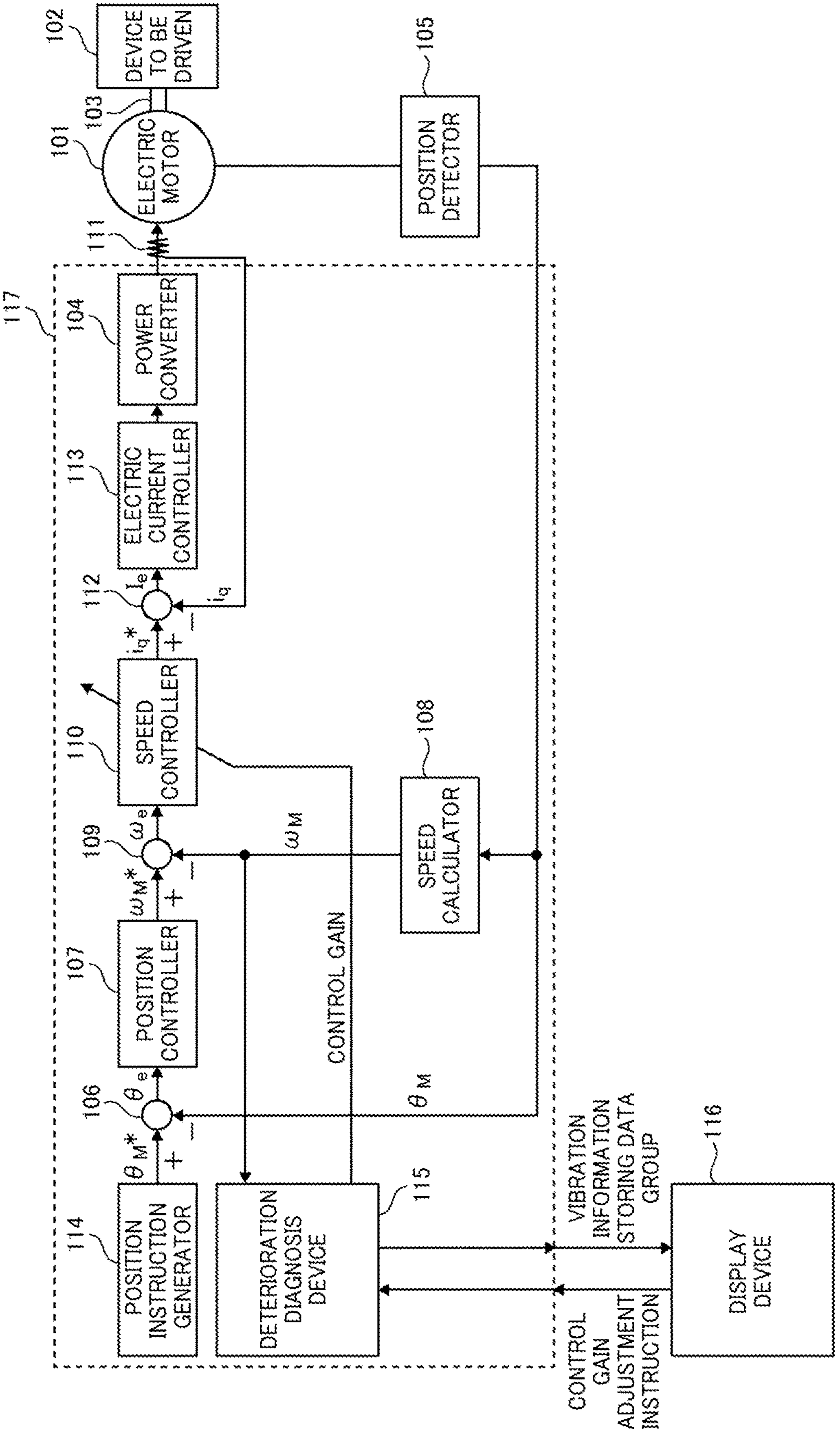
FIG. 1 is a block configuration diagram of an electric motor control device on which a deterioration diagnosis device of a first embodiment of the present invention is mounted.

FIG. 1 is a block configuration diagram of the electric motor control device on which the deterioration diagnosis device of a first embodiment of the present invention is mounted. An object of the first embodiment is to reduce the vibration of the electric motor by obtaining the operation information at the time of vibration of the electric motor and automatically adjusting the feedback control parameter.

In FIG. 1, the reference numeral 101 denotes an electric motor, the reference numeral 102 denotes a device to be driven that is driven by the electric motor 101, the reference numeral 103 denotes a coupling shaft that couples the electric motor 101 and the device to be driven 102, and the reference numeral 104 denotes a power converter that drives the electric motor 101. The reference numeral 105 denotes a position detector that is mounted on the electric motor 101 and outputs the position detection value Om of the electric motor 101, and the reference numeral 106 denotes a subtractor that calculates the position deviation $\theta_e$ between the position instruction value $\theta_M$* and the position detection value $\theta_M$ of the electric motor 101. The reference numeral 107 denotes a position controller that outputs the speed instruction value $\theta_M$* according to the position deviation de.

The reference numeral 108 denotes a speed calculator that receives, as an input, the position detection value $\theta_M$ that is outputted by the position detector 105 and outputs the speed detection value $\omega_M$ of the electric motor 101. The reference numeral 109 denotes a subtractor that calculates the speed deviation $\omega_e$ between the speed instruction value $\omega_M$* and the speed detection value $\omega_M$ of the electric motor 101, and the reference numeral 110 denotes a speed controller that outputs the torque electric current instruction value $I_q$* according to the speed deviation $\omega_e$.

The reference numeral 111 denotes an electric current detector that detects the torque electric current detection value $I_q$ that is supplied to the electric motor 101, and the reference numeral 112 denotes a subtractor that calculates the electric current deviation $I_e$ between the torque electric current instruction value $I_q$* and the torque electric current detection value $I_q$ that is supplied to the electric motor 101. The reference numeral 113 denotes an electric current controller that adjusts the output electric current of the power converter 104 according to the electric current deviation $I_e$. The reference numeral 114 denotes a position instruction generator that generates the position instruction value $\theta_M$* that drives the electric motor 101.

The reference numeral 115 denotes a deterioration diagnosis device that judges the vibration state of the electric motor according to the speed detection value $\omega_M$ that is the operation information of the electric motor. When judging, from the input of the speed detection value $\omega_M$ described above, that the electric motor 101 is in the vibration state, the deterioration diagnosis device 115 adjusts the control gain of the speed controller 110 according to the operation information at the time of vibration obtained by the deterioration diagnosis device 115, and suppresses the vibration. The reference numeral 116 denotes a display device that is connected to an electric motor control device 117 and displays the operation information at the time of vibration that is held by the deterioration diagnosis device 115. Examples of the display device 116 include, for example, a monitor, a PC, and the like.

The electric motor control device 117 is configured of the power converter 104, the subtractor 106, the position controller 107, the speed calculator 108, the subtractor 109, the speed controller 110, the subtractor 112, the electric current controller 113, the position instruction generator 114, and the deterioration diagnosis device 115. It should be noted that in the drawing, the deterioration diagnosis device 115 is incorporated into the electric motor control device 117, but the deterioration diagnosis device 115 may have a form of being externally provided on the electric motor control device 117. In this case, the deterioration diagnosis device 115 receives, as an input, the speed detection value $\omega_M$ from the speed calculator 108, from the external output terminal (not illustrated) of the electric motor control device 117 to perform the above calculation, and outputs the control gain value to the speed controller 110 through the external input terminal (not illustrated) of the electric motor control device 117.

In this embodiment, an example in which the present invention is applied to a rotation type electric motor (rotary motor) will be described. Illustrated is the embodiment for a first means for judging that the electric motor is in the vibration state while the driving state of the electric motor is monitored by the electric motor vibration state judgment value that is generated by feeding back the operation information of the electric motor to the electric motor control device, a second means for extracting the characteristic amount of the electric motor vibration, a third means for suppressing the electric motor vibration by adjusting the control gain according to the characteristic amount of the electric motor vibration, and a fourth means for monitoring the characteristic amount of the electric motor vibration.

First of all, the electric motor 101 is driven by inputting the electric motor driving instruction from the host device to the electric motor control device 117, and the device to be driven 102 is driven through the coupling shaft 103. At this time, to stably drive the device to be driven 102, the position control gain and the speed control gain of the electric motor control device 117 are required to be set to be smaller than the inherent vibration frequency that the device to be driven 102 has.

Figure 2A:
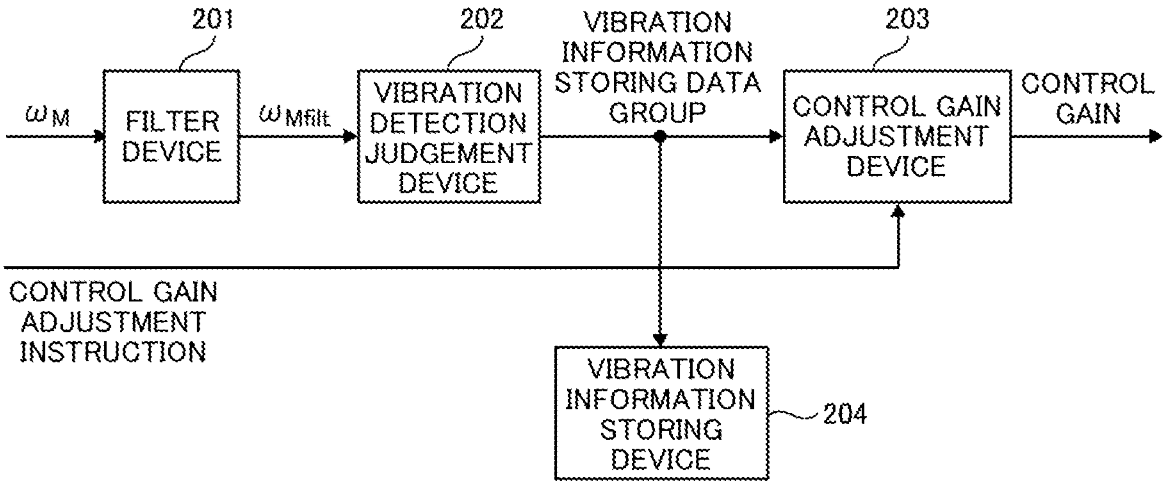
FIG. 2A is a block configuration diagram of the deterioration diagnosis device of the first embodiment.

FIG. 2A is a block configuration diagram of the deterioration diagnosis device 115. It should be noted that the deterioration diagnosis device 115 subsequently executes the process in the process cycle Vibsearchtime. The deterioration diagnosis device 115 inputs, to a filter device 201, the speed detection value $\omega_M$ that is inputted from the speed calculator 108. The filter device 201 generates the speed detection value after filter $\omega_{Mfilt}$ that is obtained by removing the high order frequency component and the low order frequency component from the speed detection value $\omega_M$. The reference numeral 202 denotes a vibration detection judgment device that judges the vibration state of the electric motor from the speed detection value after filter $\omega_{Mfilt}$ that is the output value of the filter device 201 and generates the operation information at the time of vibration. By using the means described later in FIGS. 6 and 7, the vibration detection judgment device 202 generates the vibration state flag Vibflg that represents that the electric motor 101 is in the vibration state, and obtains the operation information at the time of vibration (the information related to the vibration state) when the electric motor 101 is vibrated. It should be noted that the operation information at the time of vibration is information that becomes the characteristic of the electric motor vibration, and is referred to as, for example, the vibration frequency, the vibration amplitude value, the number of times of vibration detection, and the like when the electric motor 101 is vibrated.

When in displaying the operation information at the time of vibration on the display device 116, the user turns on the control gain adjustment instruction gainsetflg in order to suppress the vibration, a control gain adjustment device 203 outputs the control gain Controlgain that suppresses the vibration according to the operation information at the time of vibration, and inputs it to the speed controller 110.

A vibration information storing device 204 is a device for storing the operation information at the time of vibration that subsequently stores the judgment result of the vibration detection judgment device 202. In addition, the vibration information storing device 204 outputs the vibration information storing data group Vibinfogroup to the display device 116 that is connected to the electric motor control device 117, and displays the operation information at the time of vibration on the display device 116.

Figure 2B:
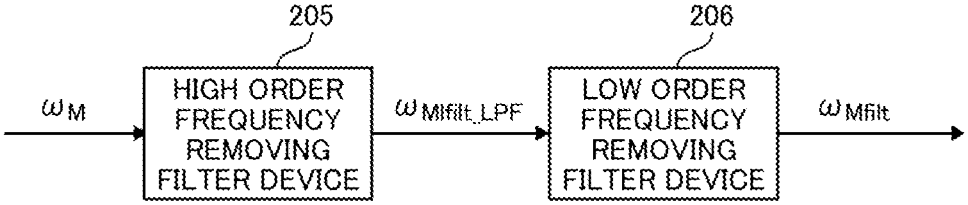
FIG. 2B is a block configuration diagram of a filter device that configures the deterioration diagnosis device of the first embodiment.

FIG. 2B is a block diagram of the filter device 201. The filter device 201 removes the high frequency noise component that occurs in the position detector 105 and the speed calculator 108 and the low frequency component that does not contribute to the vibration component of the electric motor 101. The filter device 201 inputs the inputted speed detection value $\omega_M$ to a high order frequency removing filter device 205, and generates the high frequency reduction speed detection value $\omega_{Mfilt\_LPF}$ from which the high frequency component is removed. The high frequency reduction speed detection value $\omega_{Mfilt\_LPF}$ is inputted to a low order frequency removing filter device 206, and the low order frequency removing filter device 206 generates the speed detection value after filter $\omega_{Mfilt}$ from which the low order frequency component is removed, and inputs it to the vibration detection judgment device 202.

Figure 2C:
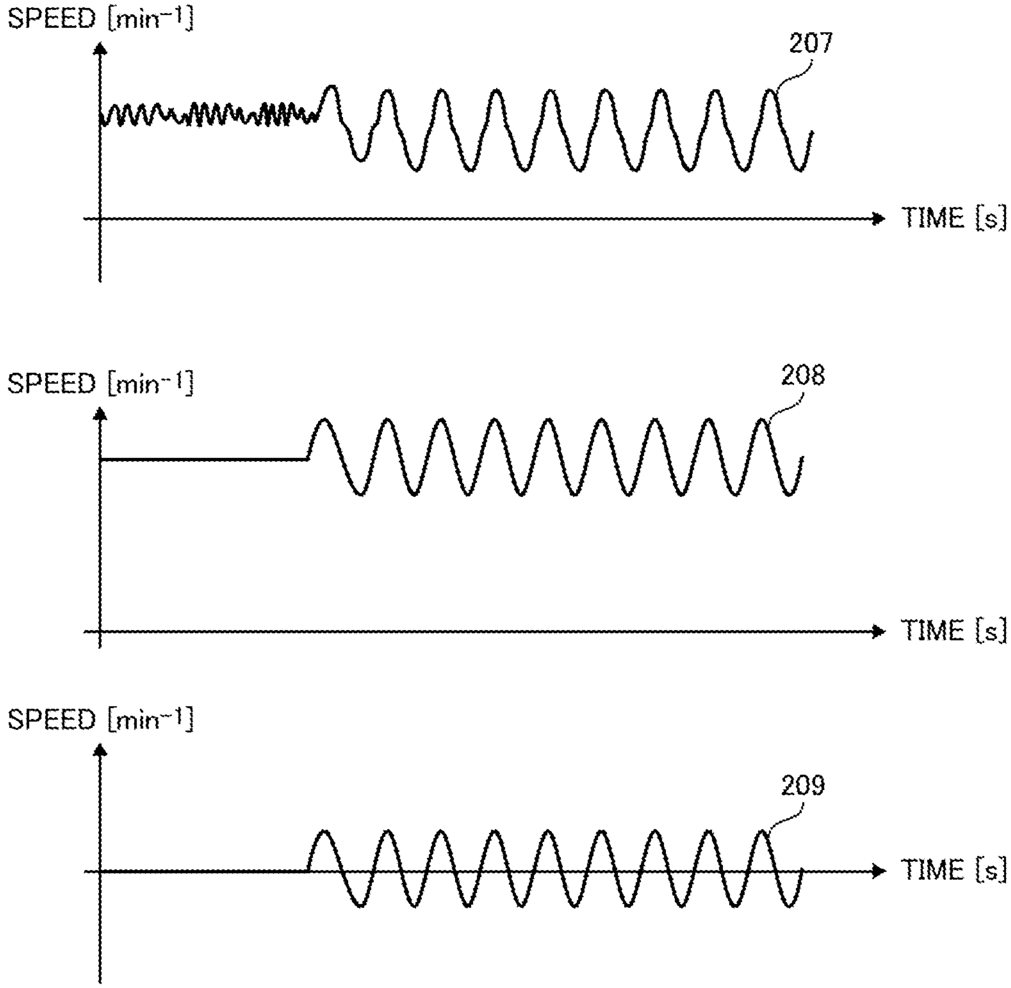
FIG. 2C is a waveform diagram of the speed detection value obtained by removing the high order frequency component and the low order frequency component by the filter device that configures the deterioration diagnosis device of the first embodiment.

In addition, in FIG. 2C, the speed detection value $\omega_M$, the high frequency reduction speed detection value $\omega_{Mfilt\_LPF}$, and the speed detection value after filter $\omega_{Mfilt}$ are indicated by a waveform 207, a waveform 208, and a waveform 209, respectively.

Figure 3:
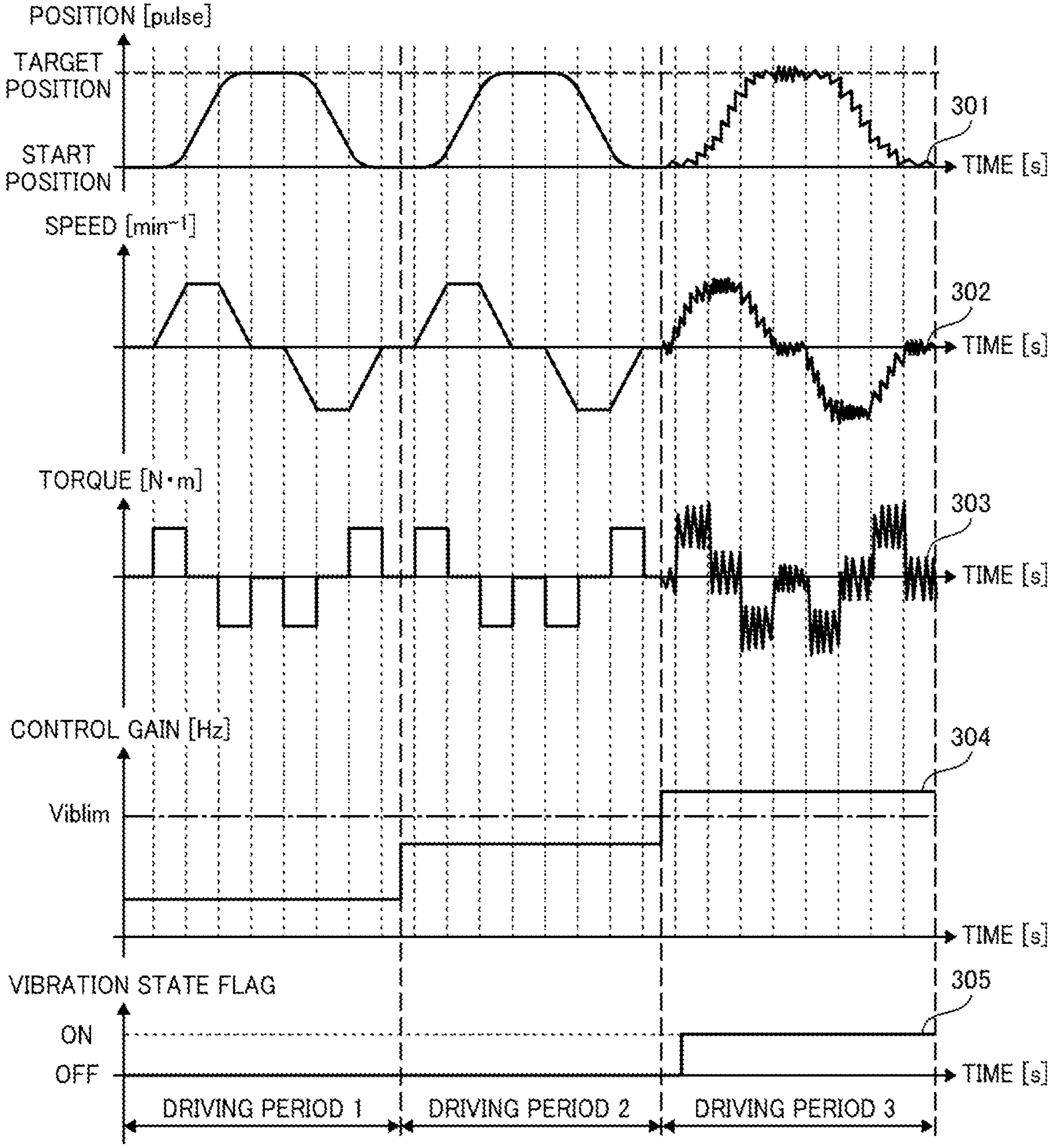
FIG. 3 is a diagram illustrating a state where an electric motor is vibrated when the control gain is increased while the electric motor is repeatedly driven forward and reversely.

FIG. 3 illustrates each of a position waveform 301, a speed waveform 302, a torque waveform 303, a control gain set value 304, and a vibration detection state 305 of the electric motor 101 when the electric motor 101 is rotated forward from the driving start position Pstart to the target position Ptarget and after the forward rotation operation is stopped, is driven to be rotated reversely to the driving start position Pstart. The position waveform 301, the speed waveform 302, the torque waveform 303, the control gain set value 304, and the vibration detection state 305 denote waveforms in which the respective vertical axes are the position Position, the speed Speed, the torque Torque, the control gain Controlgain, and the vibration state flag Vibflg, and the horizontal axis is the time Time, the waveforms representing a state where after the forward and reverse rotation operation, the control gain Controlgain is increased to perform the forward and reverse rotation again.

The driving period Pattern1, the driving period Pattern2, and the driving period Pattern3 are the forward and reverse rotation driving sections of the electric motor 101, and represent that when the driving period Pattern1 is changed to the driving period Pattern2, the control gain Controlgain is increased so that the electric motor is normally rotated forward and reversely. When the driving period Pattern2 is changed to the driving period Pattern3, the electric motor 101 starts the forward and reverse rotation operation in a state where the control gain Controlgain is set to be larger than the electric motor vibration limit control gain Viblim, so that the electric motor 101 is vibrated, and the vibration state flag Vibflg is turned on by the means described later in FIGS. 6 and 7 to represent that the electric motor 101 is vibrated. It should be noted that the electric motor vibration limit control gain Viblim includes, as a factor, the inherent vibration frequency or the like that the device to be driven 102 has. The electric motor vibration limit control gain Viblim is different according to the configuration of the device, and is a value that can be changed due to aging deterioration. In the vibration that occurs in the electric motor 101 and the device to be driven 102, the control gain Controlgain is required to be set so as to be set to be smaller than the electric motor vibration limit control gain Viblim.

Figure 4:
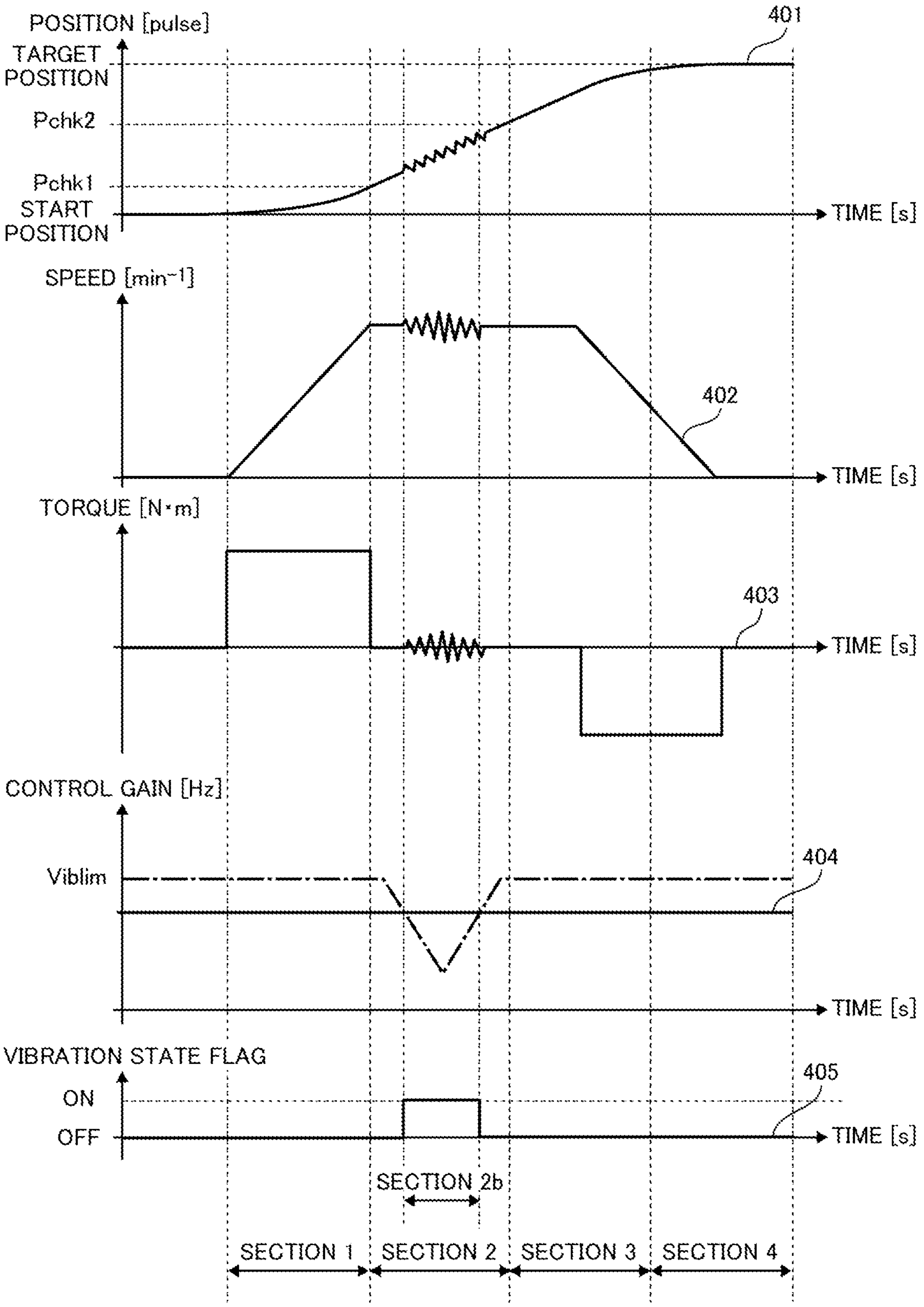
FIG. 4 is a diagram illustrating a state where the electric motor is vibrated in the partial section during forward rotation.

FIG. 4 is a diagram illustrating that when the electric motor 101 is rotated forward, vibration occurs in the partial section. For example, the case where with the device to be driven 102 as a ball screw mechanism, part of the ball screw is deteriorated or damaged and is changed in shape, and the like are given. Like FIG. 3, the reference numerals 401 to 405 denote a position waveform 401, a speed waveform 402, a torque waveform 403, a control gain set value 404, and a vibration detection state 405, respectively. In the section Section1, the section Section2, the section Section3, and the section Section4, the vibration state of the electric motor 101 is judged by using the means described later in FIGS. 6 and 7. Since in each of the section Section1, the section Section3, and the section Section4, the electric motor 101, the device to be driven 102, and the coupling shaft 103 are not in the vibration state, the speed waveform 402 is not vibrated, and the vibration state flag Vibflg is not turned on by the deterioration diagnosis device 115.

On the other hand, the section Section2 represents that the electric motor 101, the device to be driven 102, and the coupling shaft 103 are vibrated. When the electric motor 101 is vibrated, the speed waveform 402 that is the waveform of the speed detection value $\omega_M$ is the vibrated waveform. Since the speed detection value $\omega_M$ that is inputted from the speed calculator 108 is the vibrated waveform, the deterioration diagnosis device 115 judges, by using the means described later in FIGS. 6 and 7, that the electric motor 101 is in the vibration state, and turns on the vibration state flag Vibflg.

That is, with respect to the section Section1 to the section Section4, the presence or absence of the vibration of the electric motor 101 is judged in each of the sections, so that not only the vibration of the operation of the entire device, but also the vibration that occurs at any position of the device operation, can be detected. In addition, by suppressing only the vibration in the section in which the vibration occurs, the influence of the vibration suppression can be suppressed in part.

Figure 5:
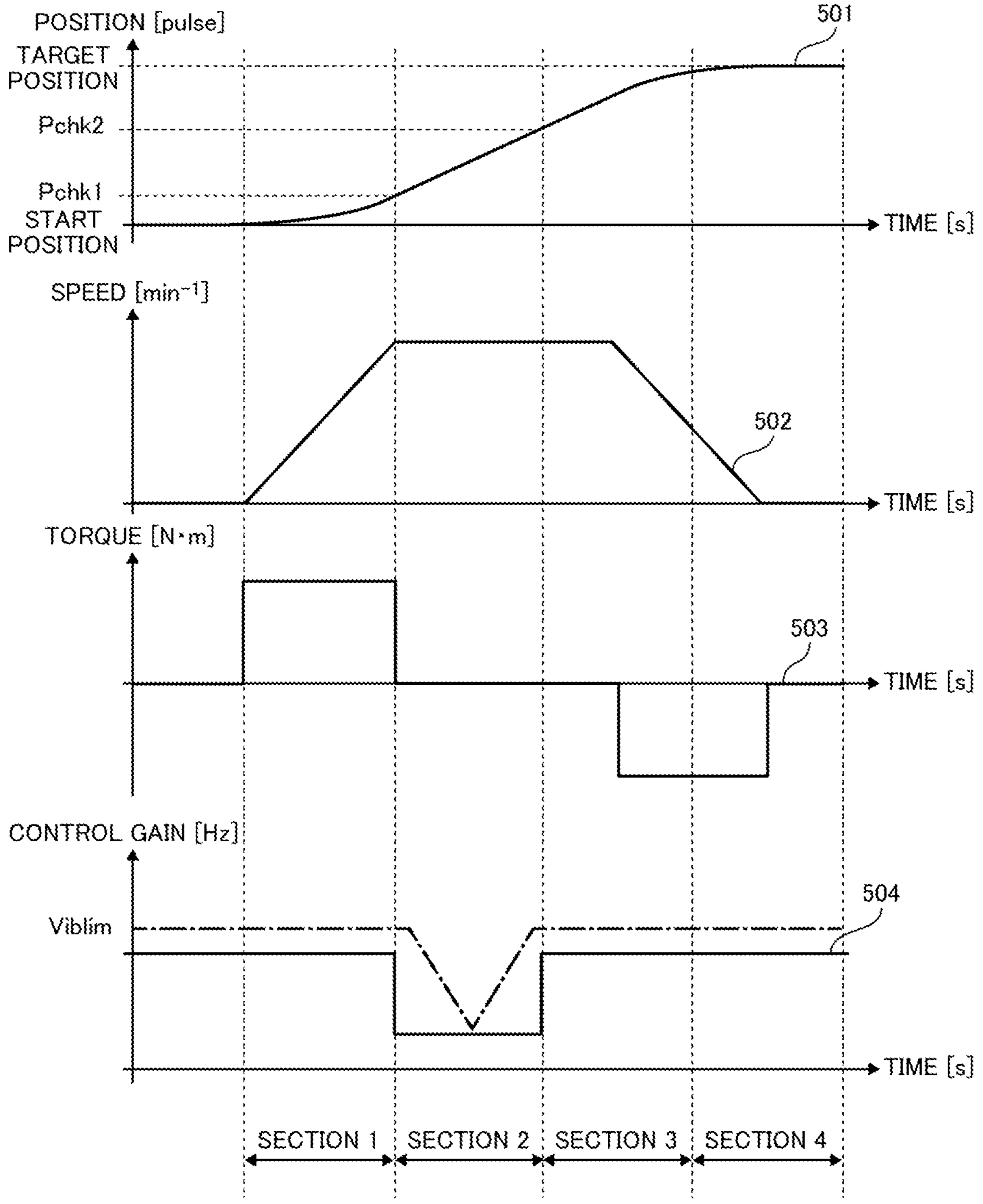
FIG. 5 is a diagram illustrating a state where the control gain is reduced only in the corresponding section in order to suppress the vibration that occurs in the partial section while the electric motor is rotated forward.

FIG. 5 illustrates an example of the vibration suppression method when the vibration state flag is turned on in the section Section2 of FIG. 4. As the operation information at the time of vibration, the vibration detection judgment device 202 stores, in the vibration information storing device 204, that the electric motor 101 is vibrated between the position Pchk1 and the position Pchk2 in the section Section2 in which the vibration state flag Vibflg is turned on, as illustrated in the vibration detection state 405. The operation information at the time of vibration when the vibration state flag Vibflg is turned on is inputted to the control gain adjustment device 203, and the control gain Controlgain is reduced only in the section Section2 by using the means described later in FIG. 9, so that the driving that suppresses the vibration of the electric motor 101 is enabled. Needless to say, the reduction of the control gain Controlgain is an example, and besides, it is possible to use the means for suppressing the vibration only in the designated section, for example, for reducing the vibration of the electric motor 101 only in the section Section2 by a notch filter that removes the designated vibration frequency component. In addition, the electric motor 101 is mounted on the device to be driven 102, and the vibration amplitude value $\omega_{Mstart}$ of the speed detection value in the vibration unoccurrence state is measured, and is compared with the vibration amplitude amount $\omega_{Mamp}$ described later at the time of vibration occurrence, so that the increase amount Vibinc at the time of vibration occurrence can be expressed by Equation (1), and is applicable to the reduction amount setting of the notch filter.

$$Vibinc = \log\left|\omega_{Mamp}/\omega_{Mstart}\right| \quad \text{Equation (1)}$$

Figure 6:
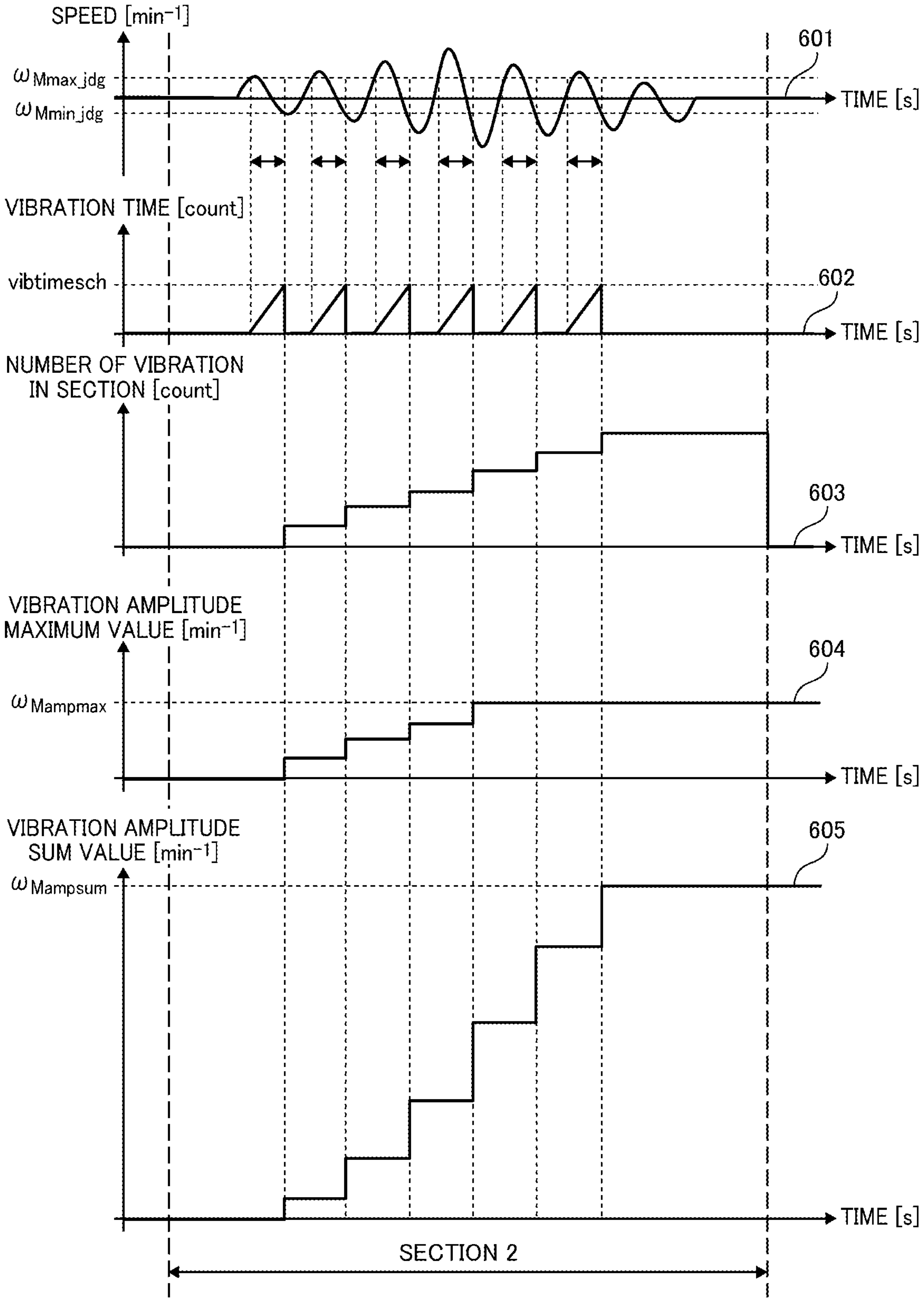
FIG. 6 is a waveform diagram obtained by measuring the characteristic amount in the electric motor vibration state of a vibration detection judgment device according to the first embodiment.

FIG. 6 illustrates the operation information at the time of vibration that is measured by the vibration detection judgment device 202 illustrated in FIG. 2A. The vibration detection judgment device 202 measures, from the speed detection value after filter $\omega_{Mfilt}$, the amplitude amount, the number of times of vibration, and the vibration cycle of the speed detection value after filter $\omega_{Mfilt}$. The process flow of the measurement will be described later in FIG. 7.

A waveform 601 denotes the speed detection value after filter $\omega_{Mfilt}$ in which the horizontal axis is the driving time Vibtime and the vertical axis is the speed.

A waveform 602 denotes the vibration time measurement value Vibtimesch in which the vertical axis is the vibration cycle measurement time and the horizontal axis is the driving time. The vibration time measurement value Vibtimesch becomes the time of the vibration half-cycle of the speed detection value after filter $\omega_{Mfilt}$ at the time of vibration occurrence. The vibration time measurement value Vibtimesch is stored as the operation information at the time of vibration in the vibration information storing device 204.

A waveform 603 denotes the number of times of section vibration Vibcnt in which the vertical axis is the number of times of section vibration Vibcnt and the horizontal axis is the driving time. The number of times of section vibration Vibcnt is counted up since the electric motor 101 causes the vibration for one cycle when after the speed detection value after filter $\omega_{Mfilt}$ is larger than the vibration judgment upper limit $\omega_{Mmax\_jdg}$, the speed detection value after filter $\omega_{Mfilt}$ is smaller than the vibration judgment lower limit $\omega_{Mmin\_jdg}$. By counting up the number of times of section vibration Vibcnt as the number of times of vibration each time the vibration is repeated a plurality of number of times, the number of times of vibration that occurs in the measurement section can be measured. The number of times of vibration Vibcnt is stored as the operation information at the time of vibration in the vibration information storing device 204.

A waveform 604 denotes a waveform in which the vertical axis is the section vibration amplitude maximum value $\omega_{Mampmax}$, and the horizontal axis is the driving time. For the section vibration amplitude maximum value $\omega_{Mampmax}$, the vibration amplitude value $\omega_{Mamp}$ that becomes the largest value at the time of measuring the vibration amplitude in each of the measurement sections of the vibration amplitude value $\omega_{Mamp}$ described later in FIG. 7 a plurality of number of times is stored, as the section vibration amplitude maximum value $\omega_{Mampmax}$, in the vibration information storing device 204.

A waveform 605 is a waveform in which the vertical axis is the vibration amplitude sum value, and the horizontal axis is the driving time. The vibration amplitude sum value $\omega_{Mampsum}$ is generated by summing the vibration amplitude value $\omega_{Mamp}$ each time the vibration of the electric motor 101 is detected. In addition, when the vibration measurement of the electric motor 101 is completed for one section, the vibration amplitude average value $\omega_{Mampave}$ is calculated by dividing the vibration amplitude sum value $\omega_{Mampsum}$ by the number of times of section vibration Vibcnt. The vibration amplitude average value $\omega_{Mampave}$ is expressed by Equation (2).

$$\omega_{Mampave} \div \omega_{Mampsum} \div \text{Vibcnt} \quad \text{Equation (2)}$$

After a result, the vibration amplitude average value $\omega_{Mampave}$ and the vibration amplitude sum value $\omega_{Mampsum}$ are stored in the vibration information storing device 204. In addition, the section start position and the section end position are stored in the vibration information storing device 204 in each of the sections. In the section start position and the section end position referred herein, the section start position is the position Pchk1 and the section end position is the Pchk2 when the section Section2 is taken as an example.

Figure 7A:
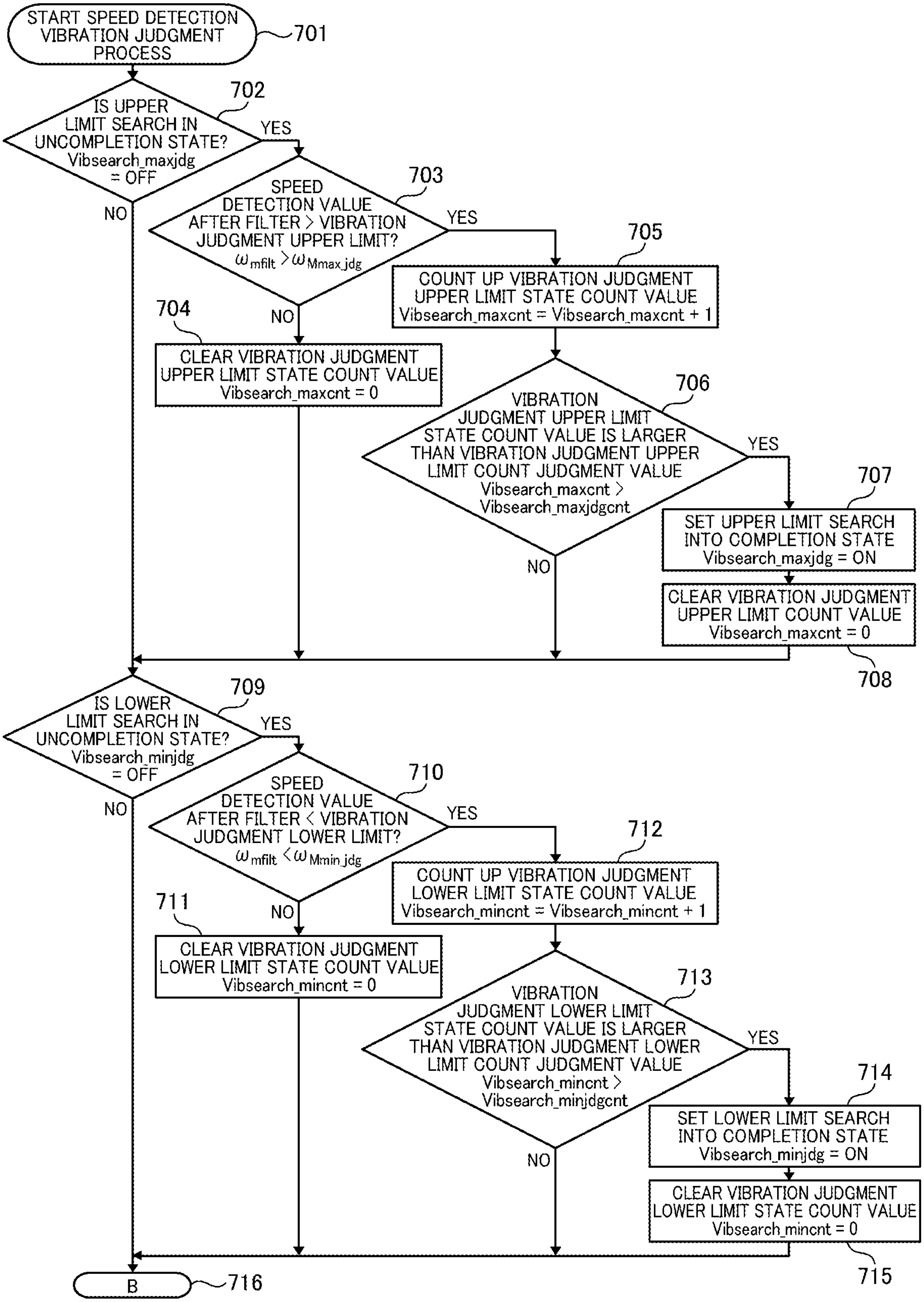
FIG. 7A is a process flowchart of the vibration detection judgment device according to the first embodiment.
Figure 7B:
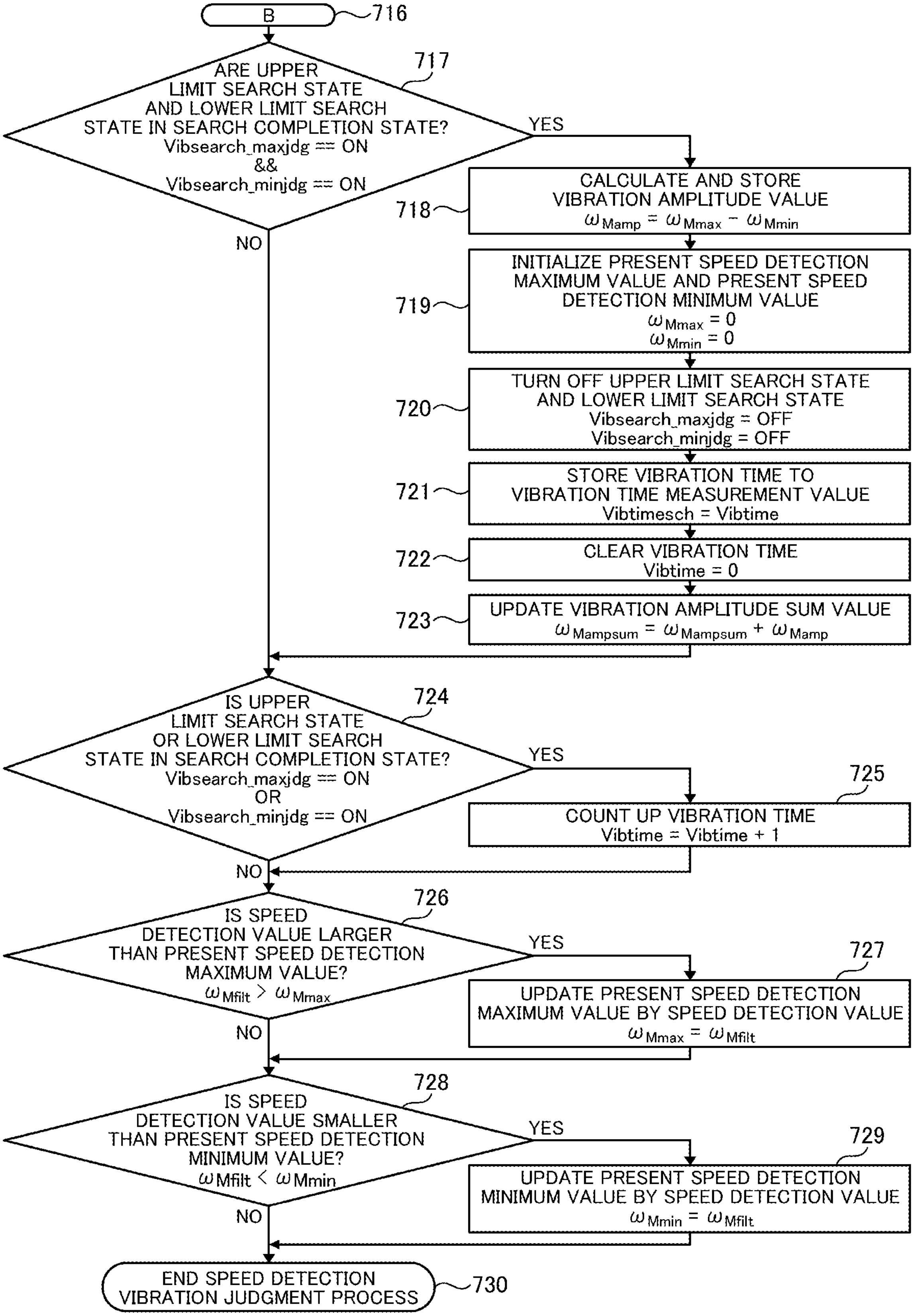
FIG. 7B is a process flowchart of the vibration detection judgment device according to the first embodiment following FIG. 7A.

FIGS. 7A, 7B are the process flowcharts of the vibration detection judgment device 202. The vibration detection judgment device 202 judges the vibration state from the swinging of the value of the speed detection value after filter $\omega_{Mfilt}$ in the positive or negative direction when the electric motor 101 is in the vibration state. For the vibration state, when detecting continuously a plurality of number of times that the speed detection value after filter $\omega_{Mfilt}$ is smaller than the vibration judgment lower limit and that the speed detection value after filter $\omega_{Mfilt}$ is larger than the vibration judgment upper limit, respectively, the vibration detection judgment device 202 judges that the electric motor 101 is vibrated, and updates the operation information at the time of vibration.

A process 701 starts the process of the vibration detection judgment device 202 to shift to a comparison process 702. The comparison process 702 judges that the upper limit search state is uncompleted (Vibsearch_maxjdg=OFF). When the upper limit search state is uncompleted, the comparison process 702 moves to a process 703 in order to judge that the value of the speed detection value after filter $\omega_{Mfilt}$ is swung in the positive direction. It should be noted that when the upper limit search state is in the completion state, the comparison process 702 judges that the value of the speed detection value after filter $\omega_{Mfilt}$ is swung in the positive direction, and shifts to a comparison process 709.

By detecting continuously a plurality of number of times that the value of the speed detection value after filter $\omega_{Mfilt}$ is larger than the vibration judgment upper limit $\omega_{Mmax\_jdg}$, the comparison process 703 to a process 708 judge that the value of the speed detection value after filter $\omega_{Mfilt}$ is swung in the positive direction. Hereinafter, this will be successively illustrated.

By judging that the speed detection value after filter $\omega_{Mfilt}$ is larger than the vibration judgment upper limit $\omega_{Mmax\_jdg}$ ($\omega_{Mfilt} > \omega_{Mmax\_jdg}$), the comparison process 703 judges that the speed detection value after filter $\omega_{Mfilt}$ has an amplitude amount above a certain amount with respect to the positive direction.

When in the comparison process 703, the speed detection value after filter $\omega_{Mfilt}$ is equal to or less than the vibration judgment upper limit $\omega_{Mmax\_jdg}$, the comparison process 703 shifts to the process 704, and the process 704 clears the vibration judgment upper limit state count value Vibsearch_maxcnt that represents the number of times in which the speed detection value after filter $\omega_{Mfilt}$ is continuously above the vibration judgment upper limit $\omega_{Mmax\_jdg}$ (Vibsearch_maxcnt=0), and shifts to the comparison process 709.

To measure the number of times in which the speed detection value after filter $\omega_{Mfilt}$ is above the vibration judgment upper limit $\omega_{Mmax\_jdg}$, the process 705 counts up the vibration judgment upper limit state count value Vibsearch_maxcnt (Vibsearch_maxcnt=Vibsearch_maxcnt+1), and shifts to the comparison process 706.

When in the comparison process 706, the vibration judgment upper limit state count value Vibsearch_maxcnt is larger than the vibration judgment upper limit count judgment value Vibsearch_maxjdgcnt (Vibsearch_maxcnt>Vibsearch_maxjdgcnt), the speed detection value after filter $\omega_{Mfilt}$ is continuously above the vibration judgement upper limit $\omega_{Mmax\_jdg}$ a certain number of times, so that the comparison process 706 judges that the value of the speed detection value after filter $\omega_{Mfilt}$ is swung in the positive direction, and shifts to the process 707.

The process 707 sets the upper limit search state to the completion state (Vibsearch_maxjdg-ON), and shifts to the process 708, and the process 708 clears the vibration judgement upper limit count value (Vibsearch_maxcnt=0), and shifts to the process 709.

It should be noted that when in the comparison process 706, the vibration judgement upper limit state count value Vibsearch_maxcnt is equal to or less than the vibration judgement upper limit count judgement value Vibsearch_maxjdgcnt, the speed detection value after filter $\omega_{Mfilt}$ is not continuously above the vibration judgement upper limit $\omega_{Mmax\_jdg}$ a certain number of times, so that the comparison process 706 shifts to the comparison process 709 while the upper limit search state is in the uncompletion state.

The comparison process 709 judges that the lower limit search state is uncompleted (Vibsearch_minjdg=OFF). When the lower limit search state is uncompleted, the comparison process 709 moves to a process 710 in order to judge that the value of the speed detection value after filter $\omega_{Mfilt}$ is swung in the negative direction. It should be noted that when the lower limit search state is in the completion state, the comparison process 709 judges that the value of the speed detection value after filter $\omega_{Mfilt}$ is swung in the negative direction, and shifts to a process 716.

By detecting continuously a plurality of number of times that the value of the speed detection value after filter $\omega_{Mfilt}$ is smaller than the vibration judgment lower limit $\omega_{Mmin\_jdg}$, the comparison process 710 to a process 715 judge that the value of the speed detection value after filter $\omega_{Mfilt}$ is swung in the negative direction. Hereinafter, this will be successively illustrated.

By judging that the speed detection value after filter $\omega_{Mfilt}$ is smaller than the vibration judgment lower limit $\omega_{Mmin\_jdg}$ ($\omega_{Mfilt}<\omega_{Mmin\_jdg}$), the comparison process 710 judges that the speed detection value after filter $\omega_{Mfilt}$ has an amplitude amount above a certain amount with respect to the negative direction.

When in the comparison process 710, the speed detection value after filter $\omega_{Mfilt}$ is equal to or more than the vibration judgment lower limit $\omega_{Mmin\_jdg}$, the comparison process 710 shifts to the process 711, and the process 711 clears the vibration judgment lower limit state count value Vibsearch_mincnt that represents the number of times in which the speed detection value after filter $\omega_{Mfilt}$ is continuously below the vibration judgment lower limit $\omega_{Mmin\_jdg}$ (Vibsearch_mincnt=0), and shifts to the comparison process 716.

To measure the number of times in which the speed detection value after filter $\omega_{Mfilt}$ is below the vibration judgment lower limit $\omega_{Mmin\_jdg}$, the process 712 counts up the vibration judgment lower limit state count value Vibsearch_mincnt (Vibsearch_mincnt=Vibsearch_mincnt+1), and shifts to the comparison process 713.

When in the comparison process 713, the vibration judgment lower limit state count value Vibsearch_mincnt is larger than the vibration judgment lower limit count judgment value Vibsearch_minjdgcnt (Vibsearch_mincnt>Vibsearch_minjdgcnt), the speed detection value after filter $\omega_{Mfilt}$ is continuously above the vibration judgement lower limit $\omega_{Mmin\_jdg}$ a certain number of times, so that the comparison process 713 judges that the value of the speed detection value after filter $\omega_{Mfilt}$ is swung in the negative direction, and shifts to the process 714.

The process 714 sets the lower limit search state to the completion state (Vibsearch_minjdg=ON), and shifts to the process 715, and the process 715 clears the vibration judgement lower limit count value Vibsearch_mincnt (Vibsearch_mincnt=0), and shifts to the process 716.

It should be noted that when in the comparison process 713, the vibration judgement lower limit state count value Vibsearch_mincnt is equal to or less than the vibration judgement lower limit count judgement value Vibsearch minjdgcnt, the speed detection value after filter $\omega_{Mfilt}$ is not continuously above the vibration judgement lower limit $\omega_{Mmin\_jdg}$ a certain number of times, so that the comparison process 713 shifts to the comparison process 716 while the lower limit search state is in the uncompletion state.

In FIG. 7B, the process 716 shifts to a comparison process 717.

When the upper limit search state and the lower limit search state are both in the completion state (Vibsearch_maxjdg=ON && Vibsearch_minjdg=ON), the comparison process 717 shifts to a process 718 in order to store the operation information at the time of vibration of the electric motor 101 in the vibration information storing device 204, and shifts to a comparison process 724 when they are not in the completion state.

The process 718 calculates the vibration amplitude amount $\omega_{Mamp}$ from the difference between the present speed detection maximum value $\omega_{Mmax}$ and the present speed detection minimum value $\omega_{Mmin}$ obtained in a process 727 and a process 729 described later ($\omega_{Mamp}=\omega_{Mmax}-\omega_{Mmin}$). The vibration amplitude amount $\omega_{Mamp}$ is the amplitude value for one cycle of the vibration of the speed detection value after filter $\omega_{Mfilt}$, and represents the magnitude of the vibration. After calculating the vibration amplitude amount $\omega_{Mamp}$, the process 718 shifts to a process 719.

The process 719 is a process for initializing the present speed maximum value $\omega_{Mmax}$ and the present speed minimum value $\omega_{Mmin}$ ($\omega_{Mmax}=0$, $\omega_{Mmin}=0$) in order to obtain the vibration amplitude amount $\omega_{Mamp}$ in the next cycle. After the initialization, the process 719 shifts to a process 720.

To detect the vibration state again, the process 720 sets the upper limit search completion state and the lower limit search completion state to OFF to make them uncompleted (Vibsearch_maxjdg=OFF, Vibsearch_minjdg=OFF), and shifts to a process 721.

To store the vibration time measurement value Vibtimesch in the vibration information storing device 204, the process 721 updates it by the vibration time Vibtime (Vibtimesch=Vibtime), and shifts to a process 722. It should be noted that the vibration time measurement value Vibtimesch becomes the half-cycle of the electric motor vibration by multiplying the process cycle Vibsearchtime and the vibration time Vibtime of the vibration detection judgment device 202. The vibration frequency Vibfreq is expressed by Equation (3), and can be used when the control gain Controlgain is adjusted to be a value smaller than the vibration frequency Vibfreq.

$$Vibfreq=1\div(Vibtimesch\times Vibsearchtime\times 2) \qquad \text{Equation (3)}$$

To measure the vibration time measurement value Vibtimesch in the next cycle, the process 722 clears the vibration time Vibtime to zero (Vibtime=0), and shifts to a process 723.

To update the vibration amplitude sum value $\omega_{Mampsum}$, the process 723 sums the vibration amplitude sum value $\omega_{Mampsum}$ and the vibration amplitude amount $\omega_{Mamp}$ ($\omega_{Mampsum}=\omega_{Mampsum}+\omega_{Mamp}$), and shifts to the comparison process 724.

The comparison process 724 and a process 725 are processes for measuring the count value that becomes the half-cycle of the vibration state in the process 721. When one of the upper limit search state and the lower limit search state is in the completion state (Vibsearch_maxjdg=ON, or Vibsearch_minjdg=ON), the comparison process 724 shifts to the process 725, counts up the vibration time Vibtime in the process 725 (Vibtime=Vibtime+1), and shifts to a comparison process 726. It should be noted that when the comparison process 724 does not satisfy the condition, the comparison process 724 shifts to the comparison process 726.

The vibration time Vibtime is cleared to zero in the process 722 when the upper limit search state and the lower limit search state are both in the completion state, so that the time until after one of the upper limit search state and the lower limit search state is in the completion state, the upper limit search state and the lower limit search state are both in the completion state is measured, and the half-cycle time of the vibration is measured.

The comparison process 726 is a process for obtaining the vibration amplitude maximum value of the electric motor in order to obtain the vibration amplitude amount $\omega_{Mamp}$ of the electric motor 101. When the speed detection value after filter $\omega_{Mfilt}$ is larger than the present speed maximum value $\omega_{Mmax}$ ($\omega_{Mfilt}>\omega_{Mmax}$), the comparison process 726 shifts to the process 727. When not satisfying the condition, the comparison process 726 shifts to a comparison process 728. The process 727 updates the present speed maximum value $\omega_{Mmax}$ by the speed detection value after filter $\omega_{Mfilt}$ ($\omega_{Mmax}=\omega_{Mfilt}$), and shifts to the process 728.

The comparison process 728 is a process for obtaining the vibration amplitude minimum value of the electric motor in order to obtain the vibration amplitude amount $\omega_{Mamp}$ of the electric motor 101. When the speed detection value after filter $\omega_{Mfilt}$ is smaller than the present speed minimum value $\omega_{Mmin}$ ($\omega_{Mfilt}<\omega_{Mmin}$), the comparison process 728 shifts to the process 729. When not satisfying the condition, the comparison process 728 shifts to a process 730. The process 729 updates the present speed minimum value $\omega_{Mmin}$ by the speed detection value after filter $\omega_{Mfilt}$ ($\omega_{Mmin}=\omega_{Mfilt}$), and shifts to the process 730. The process 730 ends the process flow of the vibration detection judgment device 202. The vibration detection judgment device 202 is operated again from the process 701 when the speed detection value after filter $\omega_{Mfilt}$ is inputted.

By sequentially executing the process flow of the vibration detection judgment device 202 illustrated in FIGS. 7A and 7B, the operation information at the time of vibration of the electric motor 101 can be obtained as illustrated in FIG. 6, and by outputting it to the display device 116, the vibration judgement, the reduction means at the time of vibration occurrence, and the monitor monitoring process of the operation information at the time of vibration are enabled.

Figure 8:
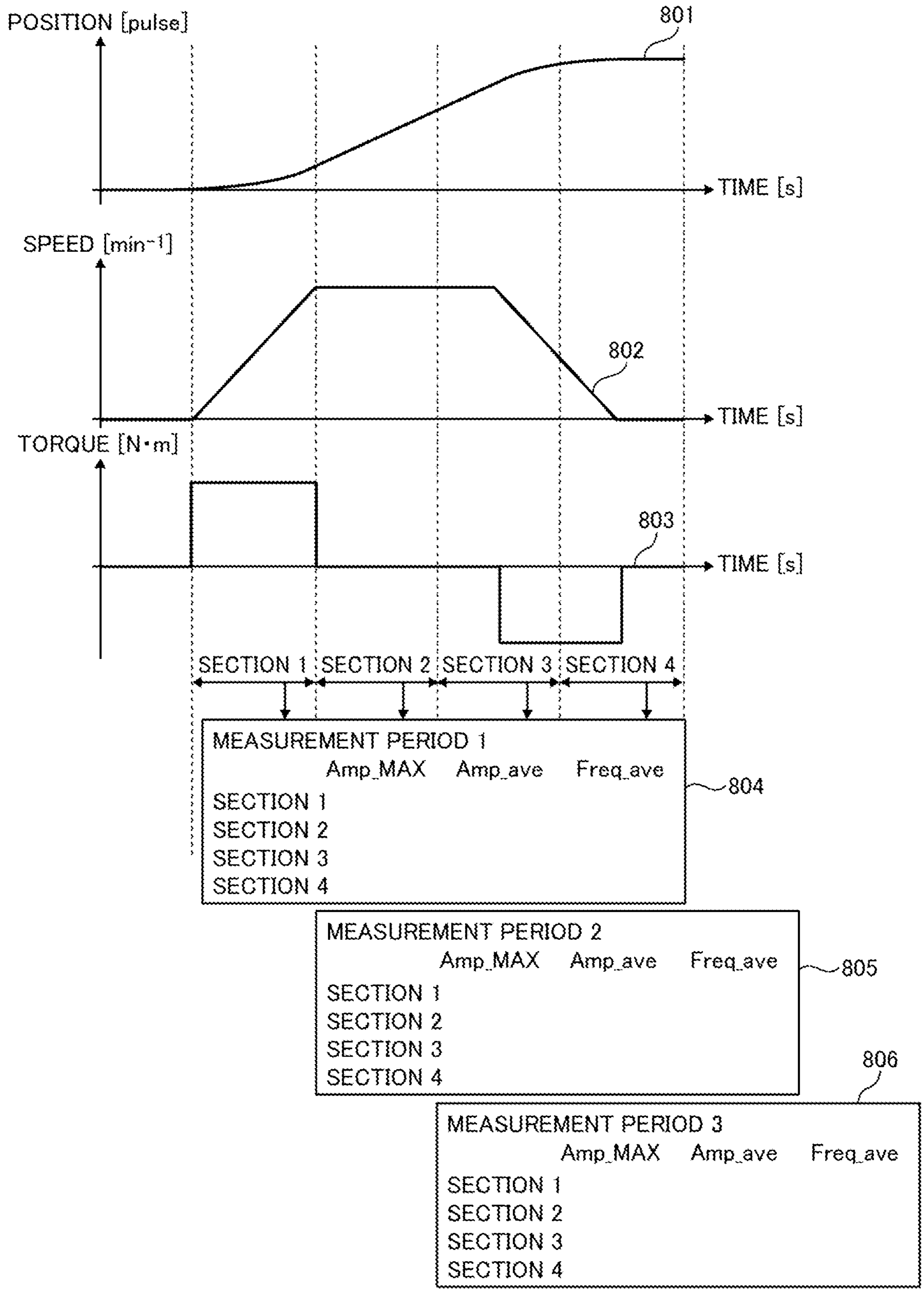
FIG. 8 is a diagram illustrating a state where the operation information at the time of vibration measured in each of the measurement periods according to the first embodiment is stored.

FIG. 8 is an example of the storing form of the operation information at the time of vibration that is stored in the vibration information storing device 204. Like FIGS. 4, 5, a waveform 801 to a waveform 803 are the position, speed, and torque waveforms. Each of the reference numerals 804 to 806 denotes the vibration information storing data group Vibinfogroup that is the data group of the operation information at the time of vibration measured in each of the measurement period Time1, the measurement period Time2, and the measurement period Time3. The measurement period is a period until the operation state is measured and stored by the deterioration diagnosis device 115 described above in each of the previously designated sections. For the measurement period, the measurement is performed a plurality of number of times, and for example, for the measurement period Time1 and the measurement period Time2, the measurement is performed only for the first time after the power supply of the driving is turned on per day. As another method, the electric motor control device 117 may have a clock function, or time information may be given to the electric motor control device 117 to perform measurement each time the previously designated time elapses.

Each of the measurement period Time1, the measurement period Time2, and the measurement period Time3 measures the operation state when the electric motor 101 is driven at the different time. In addition, for the vibration information storing data group Vibinfogroup, the operation information at the time of vibration measured from the section Section1 to the section Section4 in each of the measurement periods is stored. By measuring and storing the operation information in each of the measurement periods, the operation in which the electric motor 101 is mounted on the device to be driven 102 and is then continued to be driven can always be stored, and can be displayed on the externally mounted monitor or the like when the driving state of the electric motor is changed due to the aging deterioration.

Figure 9A:
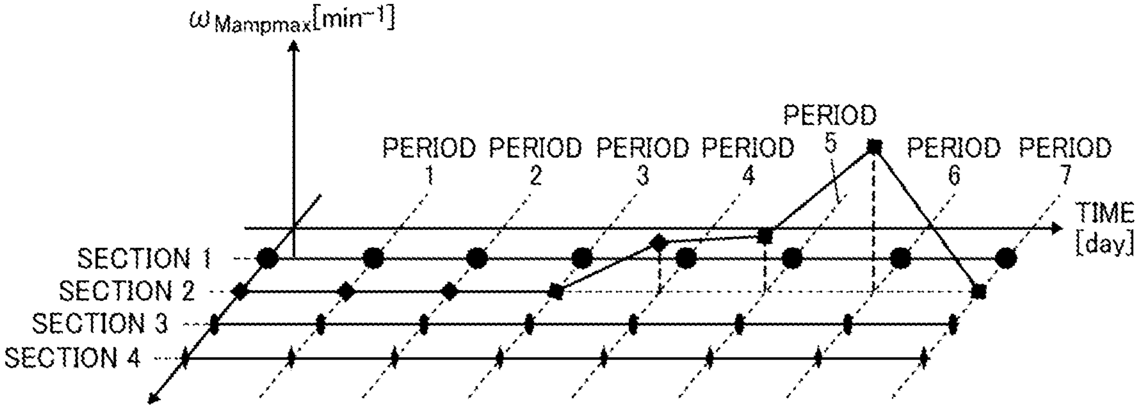
FIG. 9A is a diagram displaying, on a display device, the operation information at the time of vibration (vibration amplitude maximum value) stored by a vibration information storing device according to the first embodiment.
Figure 9B:
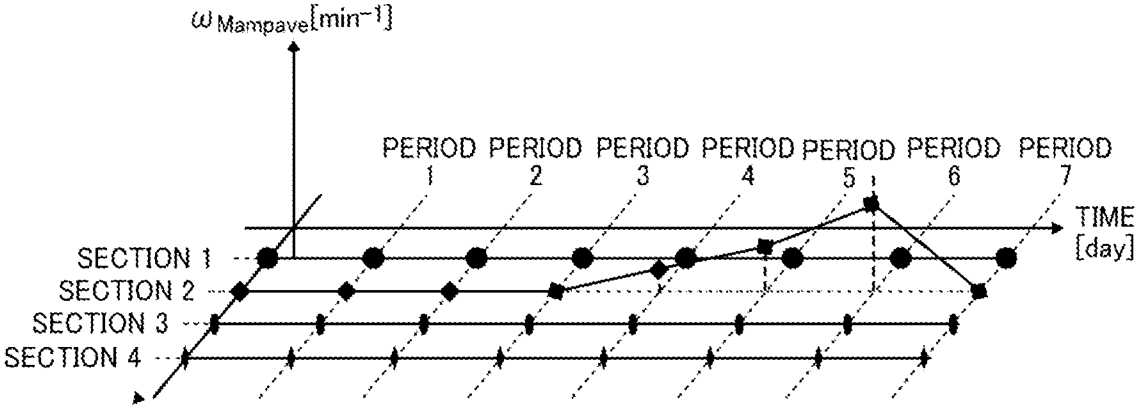
FIG. 9B is a diagram displaying, on the display device, other operation information at the time of vibration (vibration amplitude average value) stored by the vibration information storing device according to the first embodiment.
Figure 9C:
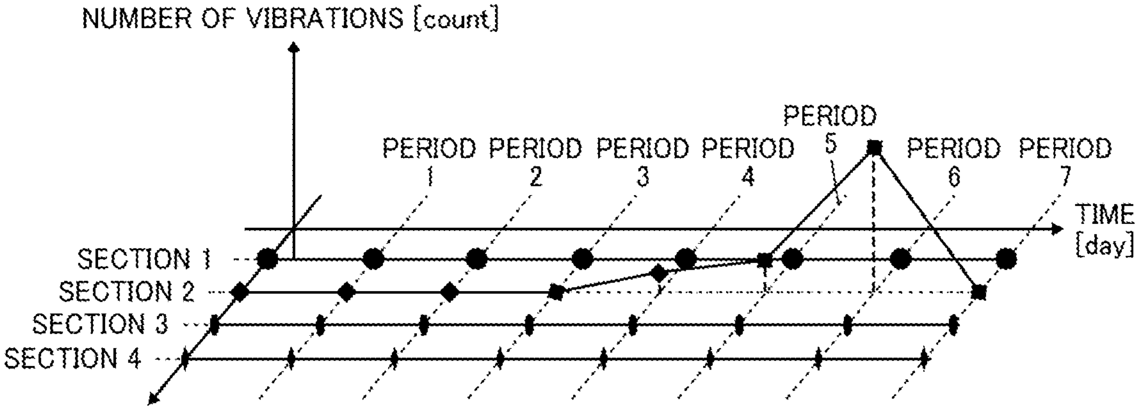
FIG. 9C is a diagram displaying, on the display device, other operation information at the time of vibration (the number of times of vibrations) stored by the vibration information storing device according to the first embodiment.

FIGS. 9A to 9C are examples of display waveforms when the operation information at the time of vibration of the vibration information storing device 204 that is stored in FIG. 8 is outputted to the display device 116.

The X axis direction is the time, the Y axis direction is the section, and the Z axis direction can display each of any operation information at the time of vibration. FIGS. 9A, 9B, and 9C illustrate examples in which the operation information at the time of vibration displayed in the Z axis direction is changed.

FIG. 9A is a graph in which the Z axis direction is the vibration amplitude maximum value by section $\omega_{Mampmax}$, FIG. 9B is a graph in which the Z axis direction is the vibration amplitude average value by section $\omega_{Mampave}$, and FIG. 9C is a graph in which the Z axis direction is the number of times of vibration Vibcnt. FIGS. 9A to 9C illustrate that no vibration occurs until the measurement period Time3, and illustrate, from the measurement period Time4, that vibration is detected from the electric motor 101 in the section Section2.

Here, when the user confirms FIG. 9A and judges that since the vibration of the electric motor 101 is small, the vibration is not required to be removed, the operation of the electric motor 101 is continued without executing the means for suppressing the vibration. FIG. 9A illustrates that when thereafter, the electric motor 101 is continued to be driven in the measurement periods Time5 and Time6, the vibration of the electric motor 101 is increased. The user confirms FIG. 9A, and in order to suppress the vibration detected in the measurement period Time6, reduces the control gain Controlgain of the section Section2, thereby suppressing the vibration. When an example of the control gain Controlgain setting that suppresses the vibration is given, the control gain Controlgain is calculated from the number of times of vibration Vibcnt of FIG. 9C, and the control gain of the speed controller 110 is automatically set from the control gain adjustment device 203 so that it is smaller than the vibration frequency of the electric motor 101. The measurement period Time7 represents that by reducing the control gain Controlgain, the vibration of the electric motor is suppressed and the electric motor is continuously driven. At this time, the control gain of the speed controller 110 is suppressed, but the control gain of the position controller 107 may be adjusted at the same time.

Figure 10:
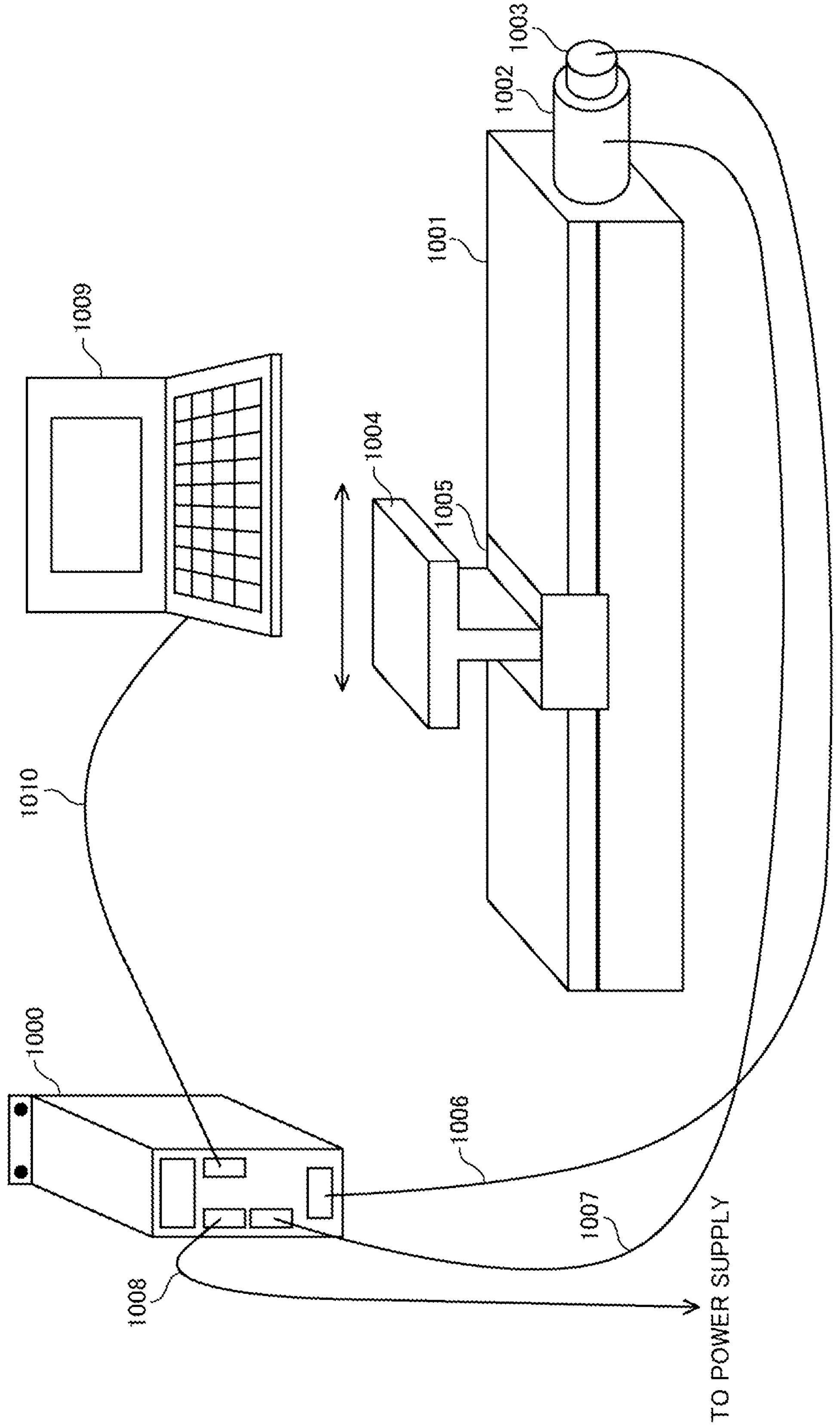
FIG. 10 is an example of the system configuration of the first embodiment to which the present invention is applied.

FIG. 10 is a system configuration diagram of the entire electric motor control device that adopts the first embodiment. In FIG. 10, the reference numeral 1001 denotes a ball screw unit, the reference numeral 1002 denotes an electric motor, the reference numeral 1003 denotes a position detector of the electric motor 1002, the reference numeral 1005 denotes a slider on which a load 1004 is mounted, the reference numeral 1000 denotes an electric motor control device, and the reference numeral 1006 denotes a cable that transmits the position detection signal of the electric motor 1002 to the electric motor control device 1000. In addition, the reference numeral 1007 denotes a cable that supplies driving power from the electric motor control device 1000 to the electric motor 1002, and the reference numeral 1008 denotes a cable that supplies power supply to the electric motor control device 1000. The reference numeral 1009 denotes a personal computer that displays the operation information at the time of vibration of the electric motor and inputs the vibration reduction instruction, and the reference numeral 1010 denotes a communication cable for transmitting the operation information at the time of vibration of the electric motor from the electric motor control device 1000 to the personal computer 1009.

It should be noted that for description, FIG. 10 as the entire system configuration diagram of the electric motor control device that can adopt the present invention has taken, as an example, the case where the electric motor of the rotation system is used to be driven by the electric motor control device, but the entire system configuration of the electric motor control device that can adopt the present invention can obtain the same effect even when the electric motor of the direct acting system is used to be driven by the electric motor control device.

In addition, the electric motor 1002 is the electric motor 101 referred to in FIG. 1, the electric motor control device 1000 is the electric motor control device 117 referred to in FIG. 1, and the personal computer 1009 is the display device referred to in FIG. 1.

Figure 11:
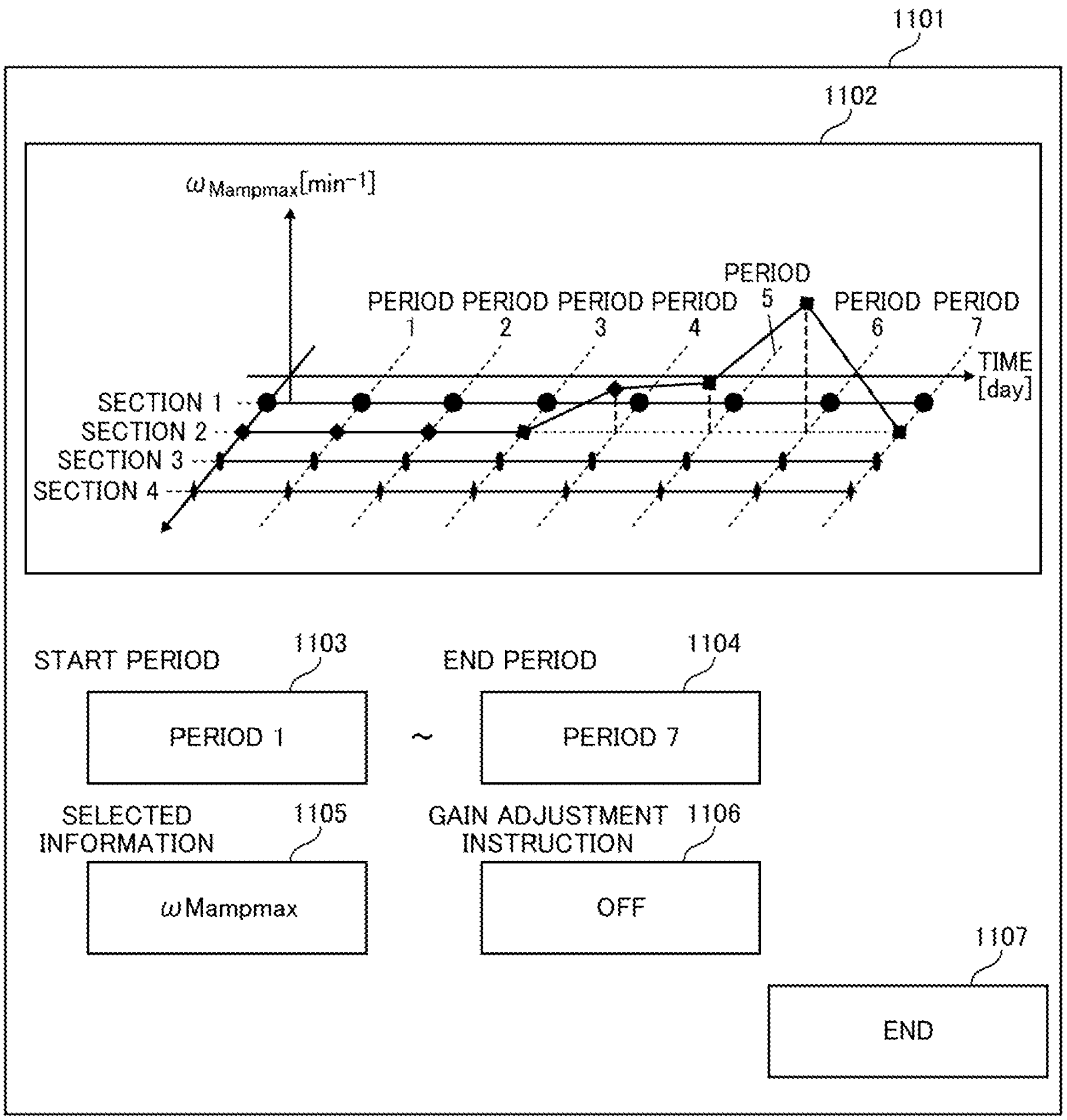
FIG. 11 is an example of a screen configuration that displays, on the display device, the operation information at the time of vibration accumulated by the vibration information storing device.

FIG. 11 is a screen configuration example that displays, on the display device 116, the operation information at the time of vibration stored by the vibration information storing device 204 through the electric motor control device 117.

The reference numeral 1101 denotes the display device 116. The reference numeral 1102 denotes a graph screen that displays the operation state at the time of vibration. In the reference numerals 1103, 1104, the display start period and the display end period of the measurement periods displayed on the graph screen 1102 are set, respectively. In the reference numeral 1105, the operation information at the time of vibration displayed on the graph screen 1102 is selected. In the case of FIGS. 9A to 9C, any one of FIGS. 9A to 9C is selected for display. The reference numeral 1106 is a button that sets ON in the case of automatically adjusting the control gain according to the operation information at the time of vibration when the electric motor is in the vibration state. When the button 1106 is turned on, the control gain adjustment instruction gainsetflg=ON is inputted to the deterioration diagnosis device through the electric motor control device 117. The control gain adjustment instruction gainsetflg that is inputted to the deterioration diagnosis device 115 is inputted to the control gain adjustment device 203, and the control gain Controlgain that reduces the vibration of the electric motor is outputted according to the operation information at the time of vibration stored by the vibration information storing device 204, and is set to the speed controller 110. The reference numeral 1107 denotes a button that ends the display of the display device 116.

According to this embodiment, the appropriate deterioration diagnosis can be performed in consideration of not only the amplitude amount of the speed detection value but also other operation information, such as the vibration cycle and the change in vibration. In addition, the control gain of the control device is adjusted on the basis of the deterioration diagnosis result so as to suppress the vibration in the section in which the vibration is detected, so that the electric motor driving that suppresses the vibration of the electric motor is enabled.

Embodiment 2

Figure 12:
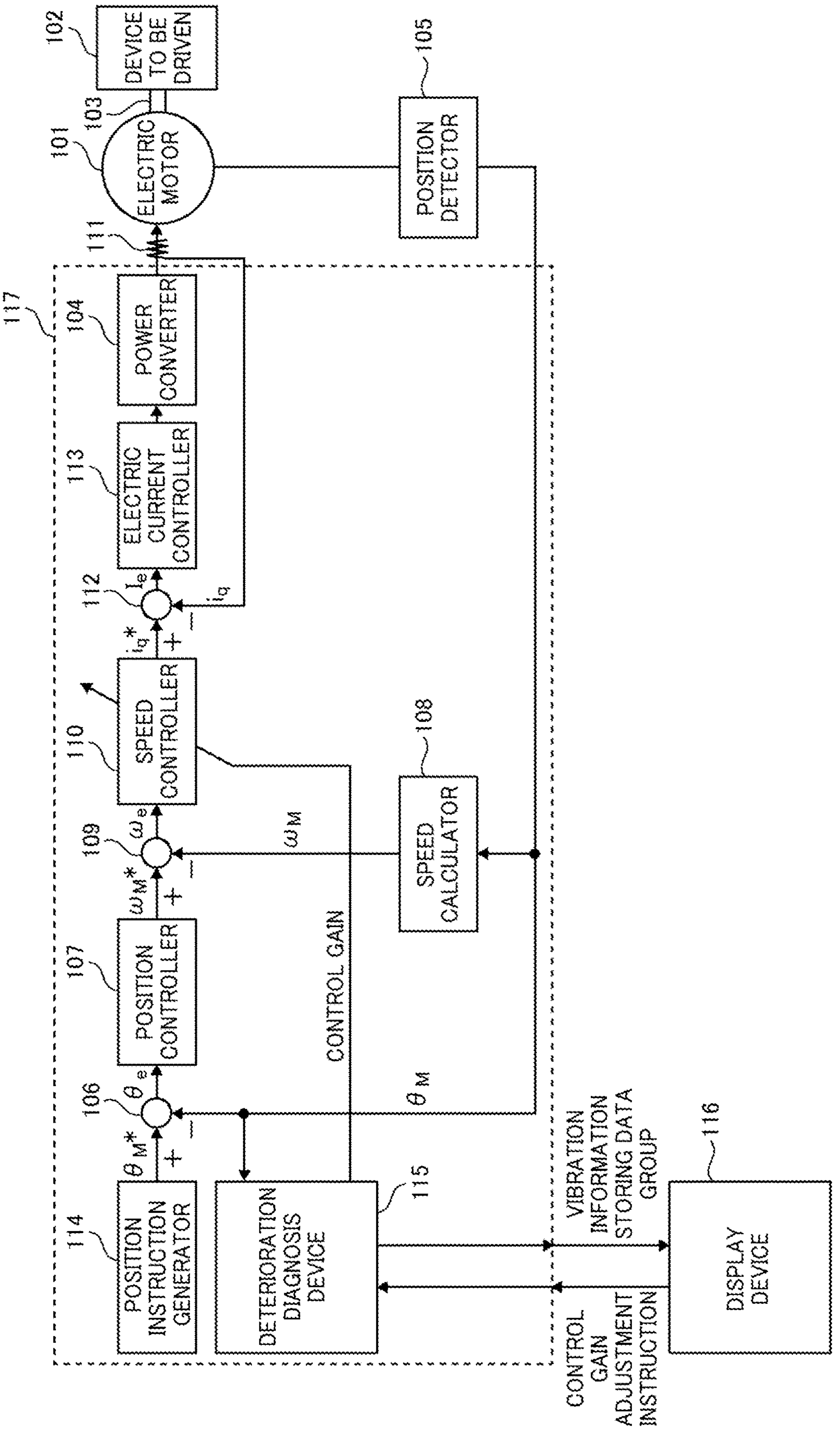
FIG. 12 is a block configuration diagram of the electric motor control device on which the deterioration diagnosis device of a second embodiment of the present invention is mounted.

FIG. 12 illustrates a block configuration diagram of the electric motor control device on which the deterioration diagnosis device of a second embodiment of the present invention is mounted. The first embodiment performs the deterioration diagnosis by using the speed detection value, but the second embodiment performs the deterioration diagnosis by using the position detection value from the position detector 105. As illustrated in FIGS. 3 and 4, the signal that indicates the position when the vibration occurs is also vibrated. As illustrated in FIG. 12, the position detection value $\theta_M$ from the position detector 105 is inputted to the deterioration diagnosis device 115. Like the first embodiment, the second embodiment also detects the vibration of the electric motor, and obtains and stores the vibration state and the operation information at the time of vibration of the electric motor. In addition, the operation information at the time of vibration is displayed to the user, thereby reducing the vibration of the electric motor according to the demand of the user.

According to this embodiment, the appropriate deterioration diagnosis of the electric motor can be performed by inputting the position detection value $\theta_M$ from the position detector 105 to the deterioration diagnosis device 115 and performing the same process as the first embodiment.

Embodiment 3

Figure 13:
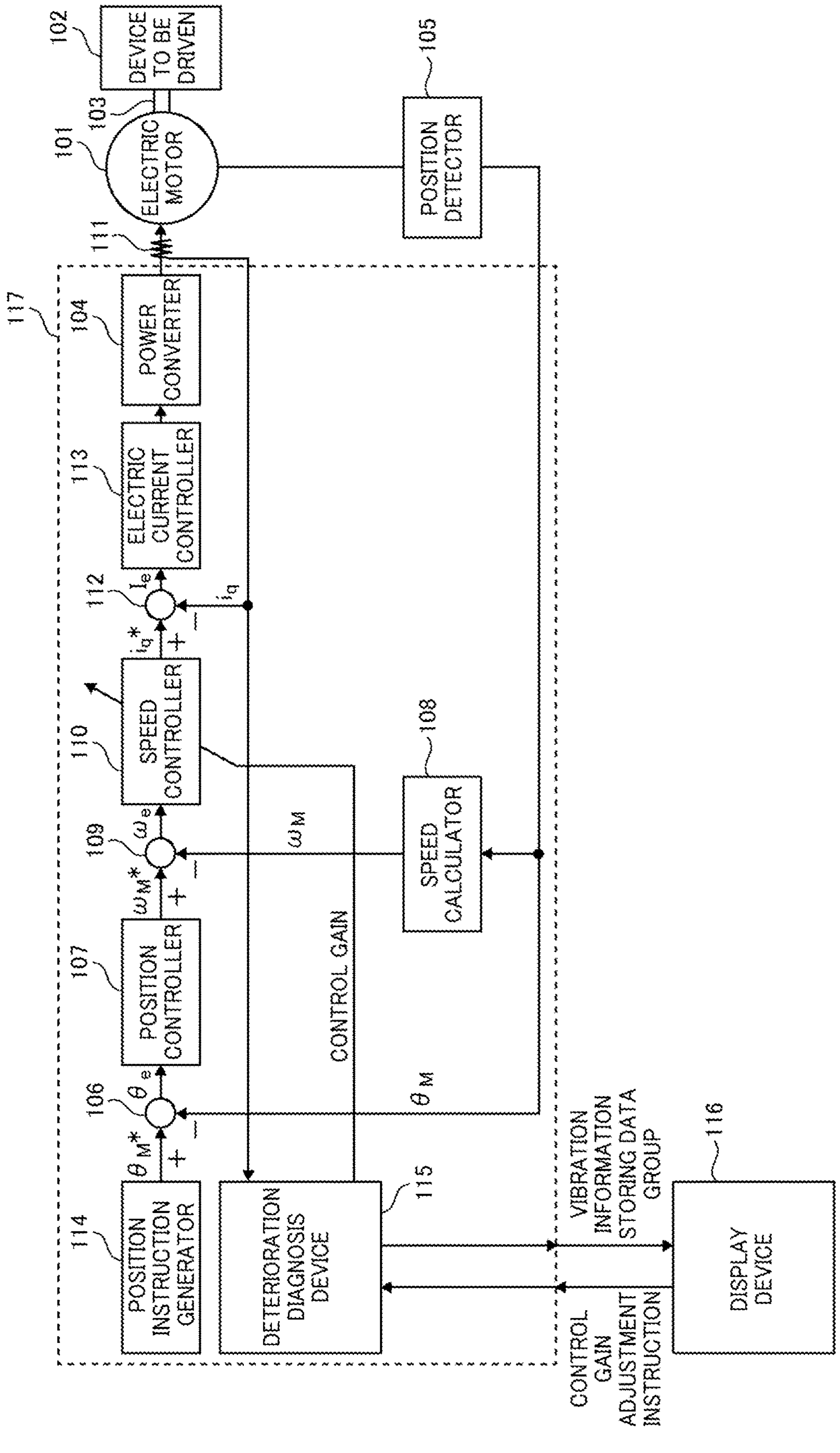
FIG. 13 is a block configuration diagram of the electric motor control device on which the deterioration diagnosis device of a third embodiment of the present invention is mounted.

FIG. 13 illustrates a block configuration diagram of the electric motor control device on which the deterioration diagnosis device of a third embodiment of the present invention is mounted. The first embodiment performs the deterioration diagnosis by using the speed detection value, but the third embodiment performs the deterioration diagnosis by using the torque electric current detection value from the electric current detector 111. As illustrated in FIGS. 3 and 4, the signal that indicates the torque when the vibration occurs is also vibrated. As illustrated in FIG. 13, the torque electric current detection value $I_q$ from the electric current detector 111 is inputted to the deterioration diagnosis device 115. Like the first and second embodiments, the third embodiment also detects the vibration of the electric motor, and obtains and stores the vibration state and the operation information at the time of vibration of the electric motor. In addition, the operation information at the time of vibration is displayed to the user, thereby reducing the vibration of the electric motor according to the demand of the user.

According to this embodiment, the appropriate deterioration diagnosis of the electric motor can be performed by inputting the torque electric current detection value $I_q$ from the electric current detector 111 to the deterioration diagnosis device 115 and performing the same process as the first embodiment.

Embodiment 4

Like the first embodiment, a fourth embodiment detects the vibration of the electric motor, and obtains and stores the vibration state and the operation information at the time of vibration of the electric motor. In addition, the operation information at the time of vibration is displayed to the user, thereby reducing the vibration of the electric motor according the demand of the user. In the fourth embodiment, as illustrated in FIG. 11, the speed detection value $\theta_M$ is inputted to the deterioration diagnosis device 115, and when the vibration amplitude value $\omega_{Mamp}$ tends to be increased, it is judged that the electric motor is vibrated.

REFERENCE SIGNS LIST

101 . . . electric motor,
102 . . . device to be driven,
103 . . . coupling shaft,
104 . . . power converter,
105 . . . position detector,
106 . . . subtractor,
107 . . . position controller,
108 . . . speed calculator,
109 . . . subtractor,
110 . . . speed controller,
111 . . . electric current detector,
112 . . . subtractor,
113 . . . electric current controller,
114 . . . position instruction generator,
115 . . . deterioration diagnosis device,
116 . . . display device,
117 . . . electric motor control device,
201 . . . filter device,
202 . . . vibration detection judgement device,
203 . . . control gain adjustment device,
204 . . . vibration information storing device

The invention claimed is:

1. A deterioration diagnosis device that is provided to be integral with or separated from an electric motor control device that includes: a power convertor that outputs power that drives an electric motor connected to a device to be driven; a position controller that outputs a speed instruction value according to a deviation between a position instruction value and a position detection value of the electric motor; a speed controller that outputs a torque electric current instruction value according to a deviation between the speed instruction value and a speed detection value of the electric motor; and an electric current controller that adjusts an output electric current of the power convertor according to a deviation between the torque electric current instruction value and a torque electric current detection value supplied to the electric motor, wherein the deterioration diagnosis device has:

a deterioration diagnosis unit that performs the deterioration diagnosis of the electric motor according to operation information of the electric motor; and a vibration information storing device that stores a diagnosis result of the deterioration diagnosis unit, and wherein the deterioration diagnosis unit stores, in the vibration information storing device, a plurality of types of information related to the vibration state of the electric motor calculated from the operation information, and judges that vibration occurs when the information related to the vibration state of the electric motor is larger than a predetermined threshold value, wherein the operation information of the electric motor is the speed detection value of the electric motor, wherein the information related to a vibration state of the electric motor includes a vibration amplitude amount and a vibration cycle of the speed detection value, wherein the deterioration diagnosis unit judges the vibration from the vibration amplitude amount and the vibration cycle of the speed detection value, and stores a vibration judgement result in the vibration information storing device, wherein the deterioration diagnosis device further includes a control gain adjustment device that creates a control gain instruction on the basis of the vibration judgement result, and wherein the control gain adjustment device sends the control gain instruction that adjusts a control gain, to the controller of the electric motor control device when the deterioration diagnosis unit judges that the vibration occurs.

2. The deterioration diagnosis device according to claim 1, wherein the operation information of the electric motor is the position detection value or the torque electric current detection value of the electric motor, and wherein the deterioration diagnosis unit judges the vibration from the vibration amplitude amount and the vibration cycle of the position detection value or the torque electric current detection value, and stores the vibration judgement result in the vibration information storing device.

3. The deterioration diagnosis device according to claim 1, wherein when the deterioration diagnosis unit judges that the vibration occurs, the information related to the vibration state of the electric motor and the deterioration diagnosis result are displayed from a display device that is integral with or separated from the deterioration diagnosis device or the electric motor control device.

4. The deterioration diagnosis device according to claim 1, wherein the deterioration diagnosis unit obtains the information related to the vibration state of the electric motor in each of the previously designated driving sections of the electric motor, and accumulates the information related to the vibration state of the electric motor in the vibration information storing device, and wherein the accumulated information related to the vibration state of the electric motor is displayed on the display device in time series.

5. A deterioration diagnosis method comprising:

a first step by which an electric motor control device that drives an electric motor obtains the operation information of the electric motor;

a second step by which a plurality of types of information related to the vibration state of the electric motor is measured from the obtained operation information;

a third step by which the plurality of types of information related to the measured vibration state of the electric motor is stored;

a fourth step by which it is judged, by a deterioration diagnosis unit, that the electric motor is vibrated when the information related to the vibration state is above a predetermined threshold value, and a vibration judgement result is displayed to a user; and a fifth step by which a vibration characteristic amount is extracted from the information that judges the vibration to suppress the vibration, wherein the operation information of the electric motor is the speed detection value of the electric motor, wherein the information related to a vibration state of the electric motor includes a vibration amplitude amount and a vibration cycle of the speed detection value, wherein the deterioration diagnosis unit judges the vibration from the vibration amplitude amount and the vibration cycle of the speed detection value, and stores a vibration judgement result in the vibration information storing device, wherein the deterioration diagnosis device further includes a control gain adjustment device that creates a control gain instruction on the basis of the vibration judgement result, and wherein the control gain adjustment device sends the control gain instruction that adjusts a control gain, to the controller of the electric motor control device when the deterioration diagnosis unit judges that the vibration occurs.

6. The deterioration diagnosis method according to claim 5, wherein in the second step, the information related to the vibration state of the electric motor is obtained in each of the previously designated driving sections of the electric motor.

7. The deterioration diagnosis method according to claim 5, wherein in the fourth step, a deterioration diagnosis result is displayed to the user, and an instruction that suppresses the vibration of the electric motor is inputted according to the demand of the user.

8. The deterioration diagnosis method according to claim 5, wherein in the fourth step, the plurality of types of information related to the vibration state of the electric motor obtained by the deterioration diagnosis result is display switched according to the demand of the user.

9. An electric motor control device that includes: a power convertor that outputs power that drives an electric motor connected to a device to be driven; a position controller that outputs a speed instruction value according to the deviation between the position instruction value and the position detection value of the electric motor; a speed controller that outputs a torque electric current instruction value according to a deviation between the speed instruction value and the speed detection value of the electric motor, and an electric current controller that adjusts an output electric current of the power convertor according to a deviation between the torque electric current instruction value and a torque electric current detection value supplied to the electric motor, wherein the electric motor control device includes a deterioration diagnosis device, wherein the deterioration diagnosis device has:

a deterioration diagnosis unit that performs a deterioration diagnosis of the electric motor according to an operation information of the electric motor;

a vibration information storing device that stores a diagnosis result of the deterioration diagnosis unit; and a control gain adjustment device that creates a control gain instruction to the controller on the basis of the diagnosis result of the deterioration diagnosis unit, wherein the deterioration diagnosis unit stores, in the vibration information storing device, a plurality of types of information related to the vibration state of the electric motor calculated from the operation information, and judges that vibration occurs when the information related to the vibration state of the electric motor is larger than a predetermined threshold value, and wherein the control gain adjustment device sends the control gain instruction that adjusts a control gain, to the controller of the electric motor control device when the deterioration diagnosis unit judges that the vibration occurs, wherein the operation information of the electric motor is the speed detection value of the electric motor, wherein the information related to a vibration state of the electric motor includes a vibration amplitude amount and a vibration cycle of the speed detection value, wherein the deterioration diagnosis unit judges the vibration from the vibration amplitude amount and the vibration cycle of the speed detection value, and stores a vibration judgement result in the vibration information storing device, wherein the deterioration diagnosis device further includes a control gain adjustment device that creates a control gain instruction on the basis of the vibration judgement result, and wherein the control gain adjustment device sends the control gain instruction that adjusts a control gain, to the controller of the electric motor control device when the deterioration diagnosis unit judges that the vibration occurs.

10. The electric motor control device according to claim 9, wherein the operation information of the electric motor is the position detection value or the torque electric current detection value of the electric motor, and wherein the deterioration diagnosis unit judges the vibration from the vibration amplitude amount and the vibration cycle of the position detection value or the torque electric current detection value, and stores a vibration judgement result in the vibration information storing device.

11. The electric motor control device according to claim 9, wherein the deterioration diagnosis unit obtains the information related to the vibration state of the electric motor in each of the previously designated driving sections of the electric motor, and accumulates the information related to the vibration state of the electric motor in the vibration information storing device, and wherein the accumulated information related to the vibration state of the electric motor is displayed on a display device in time series.

* * * * *